US010880883B2

(12) United States Patent
Bhushan et al.

(10) Patent No.: US 10,880,883 B2
(45) Date of Patent: Dec. 29, 2020

(54) LOW-LATENCY, LOW-BANDWIDTH AND LOW DUTY CYCLE OPERATION IN A WIRELESS COMMUNICATION SYSTEM

(71) Applicant: QUALCOMM Incorporated, San Diego, CA (US)

(72) Inventors: Naga Bhushan, San Diego, CA (US); Durga Prasad Malladi, San Diego, CA (US); Hao Xu, San Diego, CA (US); Yongbin Wei, La Jolla, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 14/825,999

(22) Filed: Aug. 13, 2015

(65) Prior Publication Data

US 2016/0066316 A1 Mar. 3, 2016

Related U.S. Application Data

(60) Provisional application No. 62/044,814, filed on Sep. 2, 2014.

(51) Int. Cl.
*H04W 72/04* (2009.01)
*H04W 4/70* (2018.01)

(52) U.S. Cl.
CPC ..... *H04W 72/0446* (2013.01); *H04W 72/048* (2013.01); *H04W 4/70* (2018.02)

(58) Field of Classification Search
CPC ............. H04W 72/0446; H04W 4/005; H04W 84/042; H04W 72/048; H04L 43/0864
See application file for complete search history.

(56) References Cited

U.S. PATENT DOCUMENTS 8,325,661 B2 12/2012 Montojo et al.
8,874,124 B2 10/2014 Clegg
(Continued)

FOREIGN PATENT DOCUMENTS

AU 2013203981 B2 6/2014
CA 2862680 A1 8/2013
(Continued)

OTHER PUBLICATIONS

IPEA/EP, Second Written Opinion of the International Preliminary Examining Authority, Int'l. App. No. PCT/US2015/045189, dated Sep. 7, 2016, European Patent Office, Rijswijk, NL, 7 pgs.
(Continued)

*Primary Examiner* — Jeffrey M Rutkowski
*Assistant Examiner* — Chae S Lee
(74) *Attorney, Agent, or Firm* — Holland & Hart LLP

(57) ABSTRACT

Methods, systems, and devices are described for providing allocations and signaling for different types of communications within a wireless communication system. An eNB and/or a UE may be configured to operate within the wireless communication system using two or more different types of communications. The different types of communications may differ, for example, based on round trip time (RTT) between transmission and acknowledgment of receipt of the transmission, a transmission time interval (TTI) for wireless transmissions, and/or duty cycle timing of wireless transmissions. Reserved resources within a system bandwidth may be identified for a first type of communications, and all or a portion of remaining resources within the system bandwidth may be allocated for other communications that may differ from the first type of communications based on, for example, RTT, TTI, and/or duty cycle timing.

29 Claims, 17 Drawing Sheets

(56) References Cited

U.S. PATENT DOCUMENTS

| | | | |
|---|---|---|---|
| 2009/0245190 A1 | 10/2009 | Higuchi et al. | |
| 2013/0039291 A1* | 2/2013 | Blankenship | H04L 5/001 370/329 |
| 2013/0083753 A1* | 4/2013 | Lee | H04W 74/0833 370/329 |
| 2013/0121317 A1 | 5/2013 | Lee et al. | |
| 2013/0155974 A1* | 6/2013 | Papasakellariou | H04W 72/042 370/329 |
| 2013/0201884 A1* | 8/2013 | Freda | H04W 72/005 370/278 |
| 2013/0208587 A1 | 8/2013 | Bala et al. | |
| 2013/0242824 A1 | 9/2013 | Lee et al. | |
| 2013/0242882 A1* | 9/2013 | Blankenship | H04W 72/042 370/329 |
| 2013/0272215 A1 | 10/2013 | Khoryaev et al. | |
| 2013/0315215 A1* | 11/2013 | Beale | H04W 72/0446 370/336 |
| 2015/0009932 A1* | 1/2015 | Choi | H04L 1/16 370/329 |
| 2017/0164363 A1* | 6/2017 | Zhang | H04W 72/0446 |

FOREIGN PATENT DOCUMENTS

| | | |
|---|---|---|
| CN | 103370979 A | 10/2013 |
| WO | WO-2010025279 A1 | 3/2010 |
| WO | WO-2012101394 A1 | 8/2012 |
| WO | WO-2013125842 A1 | 8/2013 |
| WO | WO-2013169468 A1 | 11/2013 |
| WO | WO 2014109684 A1 | 7/2014 |
| WO | WO-2014165838 A2 | 10/2014 |

OTHER PUBLICATIONS

Ratasuk R. et al., "License-exempt LTE deployment in heterogeneous network", Wireless Communication Systems (ISWCS), 2012 International Symposium on, IEEE, Aug. 28, 2012 (Aug. 28, 2012), pp. 246-250, XP032263759, DOI: 10.1109/ISWCS.2012.6328367, ISBN: 978-1-4673-0761-1.

ISA/EPO, International Search Report and Written Opinion of the International Searching Authority, Int'l App. No. PCT/US2015/045189, dated Dec. 1, 2015, European Patent Office, Rijswijk, NL, 13 pgs.

* cited by examiner

LOW-LATENCY, LOW-BANDWIDTH AND LOW DUTY CYCLE OPERATION IN A WIRELESS COMMUNICATION SYSTEM

CROSS REFERENCES

The present application for patent claims priority to U.S. Provisional Patent Application No. 62/044,814 by Bhushan et al., entitled "Low-Latency, Low-Bandwidth and Low Duty Cycle Operation in a Wireless Communication System," filed Sep. 2, 2014, assigned to the assignee hereof, and expressly incorporated by reference herein.

BACKGROUND

The following relates generally to wireless communication, and more specifically to techniques for resource allocation and signaling of allocated resources for different services in wireless communications systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

By way of example, a wireless multiple-access communication system may include a number of base stations, each supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

As technology advances, some more advanced mobile devices within a wireless communications network may have capabilities for communications transmitted according to different timing characteristics or using transmissions that have different control information relative to legacy mobile devices that operate within the network. Resources within the network may be used to provide services to the advanced mobile devices as well as the legacy mobile devices, and/or may be used to provide different types of services to advanced mobile devices. In certain situations, it may be desirable to provide flexibility in allocation of resources of a wireless communications network based on different mobile devices based on the service and/or the type of service to be provided to the different mobile devices.

SUMMARY

The described features generally relate to one or more improved systems, methods, and/or devices for resource allocation and signaling of allocated resources for different services in wireless communications systems. An evolved Node B (eNB) and/or a UE may be configured to operate within the wireless communications system using two or more different types of communications. The different types of communications may differ, for example, based on round trip time (RTT) between transmission and acknowledgment of receipt of the transmission, a transmission time interval (TTI) for wireless transmissions, and/or duty cycle timing of wireless transmissions. Reserved resources within a system bandwidth may be identified for a first type of communications, such as legacy communications. Some or a portion of remaining resources within the system bandwidth may be allocated for other communications that may differ from the first type of communications based on, for example, RTT, TTI, and/or duty cycle timing.

Signaling may be used to indicate resources that are allocated for the different types of communications. Such signaling may include semi-static and/or dynamic signaling to indicate that certain resources are available for certain types of communication. For example, semi-static signaling may be used to indicate allocations for different types of communications, and dynamic signaling may be used to modify one or more resources to a different type of communications for a particular TTI.

In a first set of illustrative examples, a method for wireless communication is described. In one configuration, the method may include identifying a reserved set of wireless resources within a system bandwidth for a first type of communication with a first type of user equipment (UE), and remaining wireless resources outside of the reserved set and within the system bandwidth. In such a configuration, the method may include allocating at least a subset of the remaining wireless resources for a second type of communications with a second type of UE, wherein the first type of communication and the second type of communication differ based on at least one of round trip time (RTT), or duty cycle timing.

According to the first set of examples, an apparatus for wireless communication is described. In one configuration, the apparatus may include means for identifying a reserved set of wireless resources within a system bandwidth for a first type of communication with a first type of user equipment (UE), and remaining wireless resources outside of the reserved set and within the system bandwidth. In such a configuration, the apparatus may include means for allocating at least a subset of the remaining wireless resources for a second type of communications with a second type of UE, wherein the first type of communications and the second type of communication differ based on at least one of round trip time (RTT), or duty cycle timing.

According to the first set of examples, another apparatus for wireless communication is described. In one configuration, the apparatus may include a processor, memory in electronic communication with the processor, and instructions stored in the memory. The instructions may be executable by the processor to identify a reserved set of wireless resources within a system bandwidth for a first type of communication with a first type of user equipment (UE), and remaining wireless resources outside of the reserved set and within the system bandwidth. Further, the instructions may be executable by the processor to allocate at least a subset of the remaining wireless resources for a second type of communications with a second type of UE, wherein the first type of communications and the second type of communication differ based on at least one of round trip time (RTT), or duty cycle timing.

According to the first set of examples, a non-transitory computer-readable medium storing computer-executable code for wireless communication is described. In one configuration, the code may be executable by a processor to identify a reserved set of wireless resources within a system bandwidth for a first type of communication with a first type of user equipment (UE), and remaining wireless resources outside of the reserved set and within the system bandwidth. Further, the code may be executable by the processor to allocate at least a subset of the remaining wireless resources for a second type of communications with a second type of UE, wherein the first type of communications and the second type of communication differ based on at least one of round trip time (RTT), or duty cycle timing.

In some aspects of the method, apparatuses, and/or non-transitory computer-readable medium of the first set of examples, the first type of communications and the second type of communication may differ based on RTT, and the first type of communications may have a first subframe type with a first RTT, and the second type of communications may have a second subframe type with a second RTT that is less than the first RTT. In some examples, the first type of communications may have a first subframe type with a first transmit time interval (TTI), and the second type of communications may have a second subframe type with a second TTI that is less than the first TTI. In certain examples, the first type of communications and the second type of communication may differ based on duty cycle timing, and the first type of communications may be associated with a first duty cycle and utilize either a partial or a full amount of the system bandwidth, and the second type of communications may be associated with a second duty cycle less than the first duty cycle and utilize a bandwidth less than the system bandwidth.

In some aspects of the method, apparatuses, and/or non-transitory computer-readable medium of the first set of examples, the allocation may include identifying a presence of at least one of the second type of UE, identifying a type of data service to be provided to the identified at least one of the second type of UE, and determining the subset of remaining wireless resources based at least in part on the type of data service to be provided to the second type of UE. In certain examples, the allocation may include determining that an amount of data in a data queue for the type of data service to be provided to the second type of UE is below a threshold, and dynamically re-allocating at least a portion of the subset of wireless resources to provide the first type of communications.

In some aspects of the method, apparatuses, and/or non-transitory computer-readable medium of the first set of examples, the method, apparatuses, and/or non-transitory computer-readable medium may receive a transmission from the second type of UE that uplink data is to be transmitted using the second type of communications, and perform the allocation based at least in part on the transmission from the second type of UE. In certain examples, the allocating may be performed semi-statically based on one or more of a presence of the second type of UE or a type of data service. In some examples, an indication may be transmitted indicating of the allocated subset of wireless resources. Such an indication may include, for example, a presence indication channel that indicates whether the remaining wireless resources within a subframe are configured for the second type of communications. In certain examples, the indication may include a presence indication channel that indicates a shape or an amount for the subset of the remaining wireless resources within a subframe that are configured for the second type of communications.

In some aspects of the method, apparatuses, and/or non-transitory computer-readable medium of the first set of examples, the method, apparatuses, and/or non-transitory computer-readable medium may allocate another subset of wireless communications resources from the remaining wireless resources for a third type of communications with a third type of UE, the other subset of resources being different from the subset of resources, and transmit an indication of the allocated subset of resources and the other subset of resources to one or more of the second type of UE and third type of UE. In some examples, the second type of UE comprises a machine-type communication (MTC) UE, and the other subset of the remaining wireless resources may include control and synchronization signaling sufficient for the MTC UE to receive the second type of communications independently of the first type of communications.

In a second set of illustrative examples, a method for wireless communication is described. In one configuration, the method may include allocating a subset of available wireless resources for a first type of traffic to be transmitted between a base station and at least one user equipment (UE). In such a configuration, the method may include allocating a subset of the available wireless resources for a second type of traffic to be transmitted between the base station and the at least one UE. Further, in such a configuration, the method may include transmitting a semi-static indication of the subset of wireless resources, and dynamically re-allocating at least a portion of the subset of resources to the first type of traffic based at least in part on an amount of the second type of traffic to be transmitted between the base station and the at least one UE.

According to the second set of examples, an apparatus for wireless communication is described. In one configuration, the apparatus may include means for allocating a subset of available wireless resources for a first type of traffic to be transmitted between a base station and at least one user equipment (UE). In such a configuration, the apparatus may include means for allocating a subset of the available wireless resources for a second type of traffic to be transmitted between the base station and the at least one UE, means for transmitting a semi-static indication of the subset of wireless resources, and means for dynamically re-allocating at least a portion of the subset of resources to the first type of traffic based at least in part on an amount of the second type of traffic to be transmitted between the base station and the at least one UE.

According to the second set of examples, another apparatus for wireless communication is described. In one configuration, the apparatus may include a processor, memory in electronic communication with the processor, and instructions stored in the memory. The instructions may be executable by the processor to allocate a subset of available wireless resources for a first type of traffic to be transmitted between a base station and at least one user equipment (UE). The instructions may be executable by the processor to allocate a subset of the available wireless resources for a second type of traffic to be transmitted between the base station and the at least one UE, transmit a semi-static indication of the subset of wireless resources, and dynamically re-allocate at least a portion of the subset of resources to the first type of traffic based at least in part on an amount of the second type of traffic to be transmitted between the base station and the at least one UE.

According to the second set of examples, a non-transitory computer-readable medium storing computer-executable code for wireless communication is described. In one configuration, the code may be executable by a processor to allocate a subset of available wireless resources for a first type of traffic to be transmitted between a base station and at least one user equipment (UE). Further, the code may be executable by the processor to allocate a subset of the available wireless resources for a second type of traffic to be transmitted between the base station and the at least one UE, transmit a semi-static indication of the subset of wireless resources, and dynamically re-allocate at least a portion of the subset of resources to the first type of traffic based at least in part on an amount of the second type of traffic to be transmitted between the base station and the at least one UE.

In some aspects of the method, apparatuses, and/or non-transitory computer-readable medium of the second set of examples, the first type of traffic may have a first subframe type with a first round trip time (RTT), and the second type of traffic may have a second subframe type with a second RTT that is less than the first RTT. In certain examples, the first type of communications may be associated with a first duty cycle and utilize a full amount of a system bandwidth, and the second type of communications may be associated with a second duty cycle less than the first duty cycle and utilize a bandwidth less than the system bandwidth. In some examples, transmission of the semi-static indication may include transmitting a system information block (SIB) including the indication of the subset and the subset of wireless resources.

In some aspects of the method, apparatuses, and/or non-transitory computer-readable medium of the second set of examples, the dynamic re-allocation of at least a portion of the subset of resources may include determining that an amount of the second type of traffic in a data queue is below a threshold and dynamically re-allocating at least a portion of the subset of wireless resources to provide the first type of traffic. In some examples, the method, apparatuses, and/or non-transitory computer-readable medium may receive a transmission from the at least one UE indicating a presence of uplink data of the second traffic type is to be transmitted and dynamically re-allocate resources based at least in part on the transmission from the at least one UE. In certain examples, an indication of the re-allocation of the subset of wireless resources may be transmitted, that may include a presence indication channel that indicates whether remaining wireless resources within a subframe are configured for the second type of communications, or a presence indication channel that indicates a shape or an amount for the subset of remaining wireless resources within a subframe that are configured for the second type of communications.

In a third set of illustrative examples, a method for wireless communication is described. In one configuration, the method may include receiving a semi-static allocation indicating a subset of wireless resources for transmission of a first type of traffic and a subset of wireless resources for transmission of a second type of traffic between a base station and at least one UE. In such a configuration, the method may include receiving a dynamic re-allocation of at least a portion of the subset of resources to the first type of traffic based at least in part on an amount of the second type of traffic to be transmitted between the base station and the at least one UE. In certain examples, first type of traffic has a first subframe type with a first round trip time (RTT), and the second type of traffic has a second subframe type with a second RTT that is less than the first RTT.

According to the third set of examples, an apparatus for wireless communication is described. In one configuration, the apparatus may include means for receiving a semi-static allocation indicating a subset of wireless resources for transmission of a first type of traffic and a subset of wireless resources for transmission of a second type of traffic between a base station and at least one UE. In such a configuration, the apparatus may include means for receiving a dynamic re-allocation of at least a portion of the subset of resources to the first type of traffic based at least in part on an amount of the second type of traffic to be transmitted between the base station and the at least one UE, where the first type of traffic has a first subframe type with a first round trip time (RTT), and the second type of traffic has a second subframe type with a second RTT that is less than the first RTT.

According to the third set of examples, another apparatus for wireless communication is described. In one configuration, the apparatus may include a processor, memory in electronic communication with the processor, and instructions stored in the memory. The instructions may be executable by the processor to receive a semi-static allocation indicating a subset of wireless resources for transmission of a first type of traffic and a subset of wireless resources for transmission of a second type of traffic between a base station and at least one UE. Further, the instructions may be executable by the processor to receive a dynamic re-allocation of at least a portion of the subset of resources to the first type of traffic based at least in part on an amount of the second type of traffic to be transmitted between the base station and the at least one UE, where the first type of traffic has a first subframe type with a first round trip time (RTT) and the second type of traffic has a second subframe type with a second RTT that is less than the first RTT.

According to the third set of examples, a non-transitory computer-readable medium storing computer-executable code for wireless communication is described. In one configuration, the code may be executable by a processor to receive a semi-static allocation indicating a subset of wireless resources for transmission of a first type of traffic and a subset of wireless resources for transmission of a second type of traffic between a base station and at least one UE. Further, the code may be executable by a processor to receive a dynamic re-allocation of at least a portion of the subset of resources to the first type of traffic based at least in part on an amount of the second type of traffic to be transmitted between the base station and the at least one UE, where the first type of traffic has a first subframe type with a first round trip time (RTT), and the second type of traffic has a second subframe type with a second RTT that is less than the first RTT.

In some aspects of the method, apparatuses, and/or non-transitory computer-readable medium of the third set of examples, reception of the semi-static indication may include receiving a system information block (SIB) including the indication of the subset and the subset of wireless resources. In some examples, a scheduling request may be transmitted that includes an indication that the second type of traffic is in a data queue, and the dynamic re-allocation may be based at least in part on the scheduling request. In certain examples, the reception of the dynamic re-allocation may include receiving, within each subframe of a radio frame, a presence indication channel that indicates whether the subset of resources within each subframe are configured for the second type of traffic.

In a fourth set of illustrative examples, a method for wireless communication is described. In one configuration, the method may include allocating a subset of available wireless resources for a first type of traffic to be transmitted between a base station and a first type of user equipment (UE), the subset associated with a first duty cycle and utilizing a full system bandwidth of the available wireless resources. In such a configuration, the method may include allocating a subset of the available wireless resources for a second type of traffic to be transmitted between the base station and a second type of UE, the subset associated with a second duty cycle which is longer than the first duty cycle and utilizing a bandwidth within and less than the full system bandwidth.

According to the fourth set of examples, an apparatus for wireless communication is described. In one configuration, the apparatus may include means for allocating a subset of available wireless resources for a first type of traffic to be transmitted between a base station and a first type of user equipment (UE), the subset associated with a first duty cycle and utilizing a full system bandwidth of the available wireless resources. In such a configuration, the apparatus may include means for allocating a subset of the available wireless resources for a second type of traffic to be transmitted between the base station and a second type of UE, the subset associated with a second duty cycle which is longer than the first duty cycle and utilizing a bandwidth within and less than the full system bandwidth.

According to the fourth set of examples, another apparatus for wireless communication is described. In one configuration, the apparatus may include a processor, memory in electronic communication with the processor, and instructions stored in the memory. The instructions may be executable by the processor to allocate a subset of available wireless resources for a first type of traffic to be transmitted between a base station and a first type of user equipment (UE), the subset associated with a first duty cycle and utilizing a full system bandwidth of the available wireless resources. Further, the instructions may be executable by the processor to allocate a subset of the available wireless resources for a second type of traffic to be transmitted between the base station and a second type of UE, the subset associated with a second duty cycle which is longer than the first duty cycle and utilizing a bandwidth within and less than the full system bandwidth.

According to the fourth set of examples, a non-transitory computer-readable medium storing computer-executable code for wireless communication is described. In one configuration, the code may be executable by a processor to allocate a subset of available wireless resources for a first type of traffic to be transmitted between a base station and a first type of user equipment (UE), the subset associated with a first duty cycle and utilizing a full system bandwidth of the available wireless resources. Further, the code may be executable by the processor to allocate a subset of the available wireless resources for a second type of traffic to be transmitted between the base station and a second type of UE, the subset associated with a second duty cycle which is longer than the first duty cycle and utilizing a bandwidth within and less than the full system bandwidth.

In some aspects of the method, apparatuses, and/or non-transitory computer-readable medium of the fourth set of examples, the subset of resources may include self-contained control and reference signal information sufficient for the second type of UE to receive the second type of traffic using only the subset of available wireless resources. In certain examples, the subset of wireless resources may include wireless resources for transmission of the control and reference signal information for different UEs of the second type of UE that operate according to different duty cycles. In some examples, the second type of UE may include a machine-type communication (MTC) UE.

In a fifth set of illustrative examples, a method for wireless communication is described. In one configuration, the method may include receiving, from a base station, an allocation indicating, within a system bandwidth, a subset of wireless resources for a first type of traffic and a subset of wireless resources for transmission of a second type of traffic, the subset associated with a first duty cycle and utilizing a full amount of the system bandwidth, and the subset associated with a second duty cycle which is longer than the first duty cycle and utilizing bandwidth less than the system bandwidth. In such a configuration, the method may include transmitting and receiving the second type of traffic to and from the base station using the subset of wireless resources.

According to the fifth set of examples, an apparatus for wireless communication is described. In one configuration, the apparatus may include means for receiving, from a base station, an allocation indicating, within a system bandwidth, a subset of wireless resources for a first type of traffic and a subset of wireless resources for transmission of a second type of traffic, the subset associated with a first duty cycle and utilizing a full amount of the system bandwidth, and the subset associated with a second duty cycle which is longer than the first duty cycle and utilizing bandwidth less than the system bandwidth. In such a configuration, the apparatus may include means for transmitting and receiving the second type of traffic to and from the base station using the subset of wireless resources.

According to the fifth set of examples, another apparatus for wireless communication is described. In one configuration, the apparatus may include a processor, memory in electronic communication with the processor, and instructions stored in the memory. The instructions may be executable by the processor to receive, from a base station, an allocation indicating, within a system bandwidth, a subset of wireless resources for a first type of traffic and a subset of wireless resources for transmission of a second type of traffic, the subset associated with a first duty cycle and utilizing a full amount of the system bandwidth, and the subset associated with a second duty cycle which is longer than the first duty cycle and utilizing bandwidth less than the system bandwidth. In such a configuration, the instructions may be executable by the processor to transmit and receive the second type of traffic to and from the base station using the subset of wireless resources.

According to the fifth set of examples, a non-transitory computer-readable medium storing computer-executable code for wireless communication is described. In one configuration, the code may be executable by a processor to receive, from a base station, an allocation indicating, within a system bandwidth, a subset of wireless resources for a first type of traffic and a subset of wireless resources for transmission of a second type of traffic, the subset associated with a first duty cycle and utilizing a full amount of the system bandwidth, and the subset associated with a second duty cycle which is longer than the first duty cycle and utilizing bandwidth less than the system bandwidth. Further, the code may be executable by a processor to transmit and receive the second type of traffic to and from the base station using the subset of wireless resources.

In some aspects of the method, apparatuses, and/or non-transitory computer-readable medium of the fifth set of examples, the subset of resources may include self-contained control and reference signal information sufficient to transmit and receive the second type of traffic using only the subset of available wireless resources. In certain examples, the second type of traffic may include a machine-type communication (MTC) traffic.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for resource allocation of different portions of available wireless resources for different types of communications, and for signaling of the resource allocations. In some examples, a base station and one or more UEs may be configured to operate within the wireless communications system using two or more different types of communications, such as legacy communications according to established LTE communications protocols, low latency communications having reduced RTTs relative to legacy communications, and/or low duty cycle communications having increased duty cycle timing relative to other types of communications, for example. Resources within a system bandwidth of the wireless communications system may be identified for legacy communications, and all or a portion of remaining resources within the system bandwidth may be allocated for other types of communications, such as low latency or low duty cycle communications. In some examples, the other types of communications may provide new carrier type (NCT) service or LTE service using unlicensed radio frequency spectrum band. The other type(s) of communications may differ from legacy communications based on, for example, RTT, TTI, or duty cycle timing.

Signaling may be used to indicate resources that are allocated for the other communications, and may include semi-static or dynamic signaling to indicate that certain resources are available for other types of communication, such as low latency communications having a reduced RTT relative to legacy communications or communications having increased duty cycle timing relative to legacy communications. For example, semi-static signaling may be used to indicate allocations for different types of communications through, for example, a system information block (SIB), and dynamic signaling may be used to modify one or more resources to a different type of communications for a particular TTI. In some example, a presence indication channel (PIC) may be used to indicate the presence of data for a type of communications for one or more TTIs, and the type of communications for the associated TTI may be modified based on information in the PIC.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
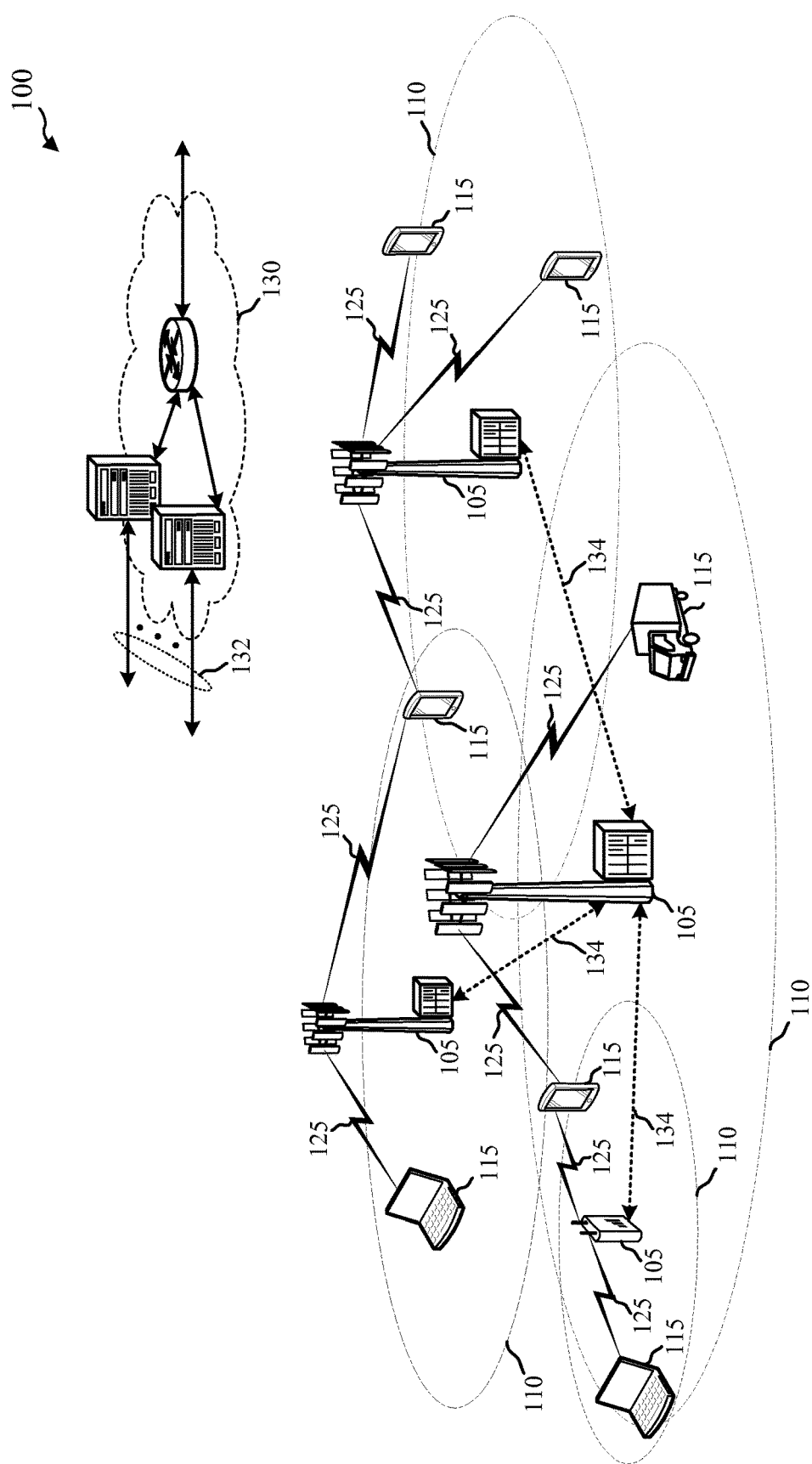
FIG. 1 shows a block diagram of a wireless communication system, in accordance with various aspects of the present disclosure.

FIG. 1 illustrates an example of a wireless communication system 100 in accordance with various aspects of the disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNB, Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 is an LTE/LTE-A network in which base stations 105 and UEs 115 may be configured to operate using two or more different types of communications, such as legacy communications according to established LTE communications protocols, low latency communications having reduced RTTs relative to legacy communications, and/or low duty cycle communications having increased duty cycle timing relative to other types of communications, for example. In LTE/LTE-A networks, the term eNB may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3rd Generation Partnership Project (3GPP) term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Reserved resources within a system bandwidth of the wireless communication system 100, in some examples, may be identified that are compatible with 3GPP LTE and LTE-A (e.g., compatible with releases 10, 11, and 12), referred to as legacy communications. All or a portion of remaining resources within the system bandwidth may be allocated for other types of communications, such as low latency or low duty cycle communications, as will be described in more detail below. Signaling may be used to indicate resources that are allocated for the other communications, and may include semi-static or dynamic signaling to indicate that certain resources are available for other types of communication, such as low latency communications having a reduced RTT relative to legacy communications or communications having increased duty cycle timing relative to legacy communications.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a machine type communication (MTC) device, a cellular phone, a personal digital assistant (PDA), a wireless modem, a wireless communication device, a handheld device, a tablet computer, a laptop computer, a cordless phone, a wireless local loop (WLL) station, or the like. In some implementations, an MTC device may be included in or operate in conjunction with a vehicle, a sensor, and/or any of numerous other applications that may use MTC devices, such as a meter (e.g., a gas or parking meter), home appliances, healthcare devices, or other monitoring devices. A UE may be able to communicate with various types of base stations and network equipment including macro eNBs, small cell eNBs, relay base stations, and the like.

The communication links 125 shown in wireless communication system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

As discussed above, various examples provide communications in a wireless communication system, such as wireless communication system 100 of FIG. 1, that may support multiple different types of communications. A first type of communications that may, for example, operate according to a first latency mode may use the frame structure, slots, symbols and subcarrier spacing as specified for legacy LTE communications. For example, time intervals in LTE/LTE-A may be expressed in multiples of a basic time unit (e.g., the sampling period, $Ts=1/30,720,000$ seconds). Time resources may be organized according to radio frames of length of 10 ms ($Tf=307200\cdot Ts$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. Additionally, communications in the first latency mode may be initiated through legacy LTE techniques, such as through paging or control channels for downlink communications, and through scheduling requests and random access procedures for uplink communications.

A second type of communications may, for example, operate according to a second latency mode, or low latency mode, in which a round trip time (RTT) between a transmission and acknowledgment of the transmission is reduced relative to the RTT for legacy communications. Additionally, communications in the low latency mode may use symbols having a reduced transmission time interval (TTI), for example through reduced symbol duration relative to legacy LTE symbols. Thus, in some cases, the legacy LTE subframe may be the smallest scheduling unit, or TTI. In other cases, including for systems that support low latency operation or a low latency mode, a TTI may be shorter than a subframe or may be employed in transmission bursts (e.g., in short TTI bursts or in selected component carriers using short TTIs). In some cases, one or more symbols may be used for shorter TTIs, where each TTI may be either an uplink or downlink symbol. The system 100 may support UE 115 operation with TTIs of different durations—in such systems, longer duration TTI may be referred to as legacy TTIs and shorter duration TTIs may be referred to as low latency TTIs. Communications according to the first and/or second types of communications may be provided by allocating resources within the available wireless communication system 100 resources for such communications.

A third type of communications may, for example, operate according to duty cycle timing that is increased relative to the duty cycle timing of the first and second types of communications. Furthermore, in some examples, the third type of communications may use a reduced system bandwidth. Communications according to the second and/or third types of communications may be provided by allocating resources within the available wireless communication system 100 resources for such communications.

Figure 2:
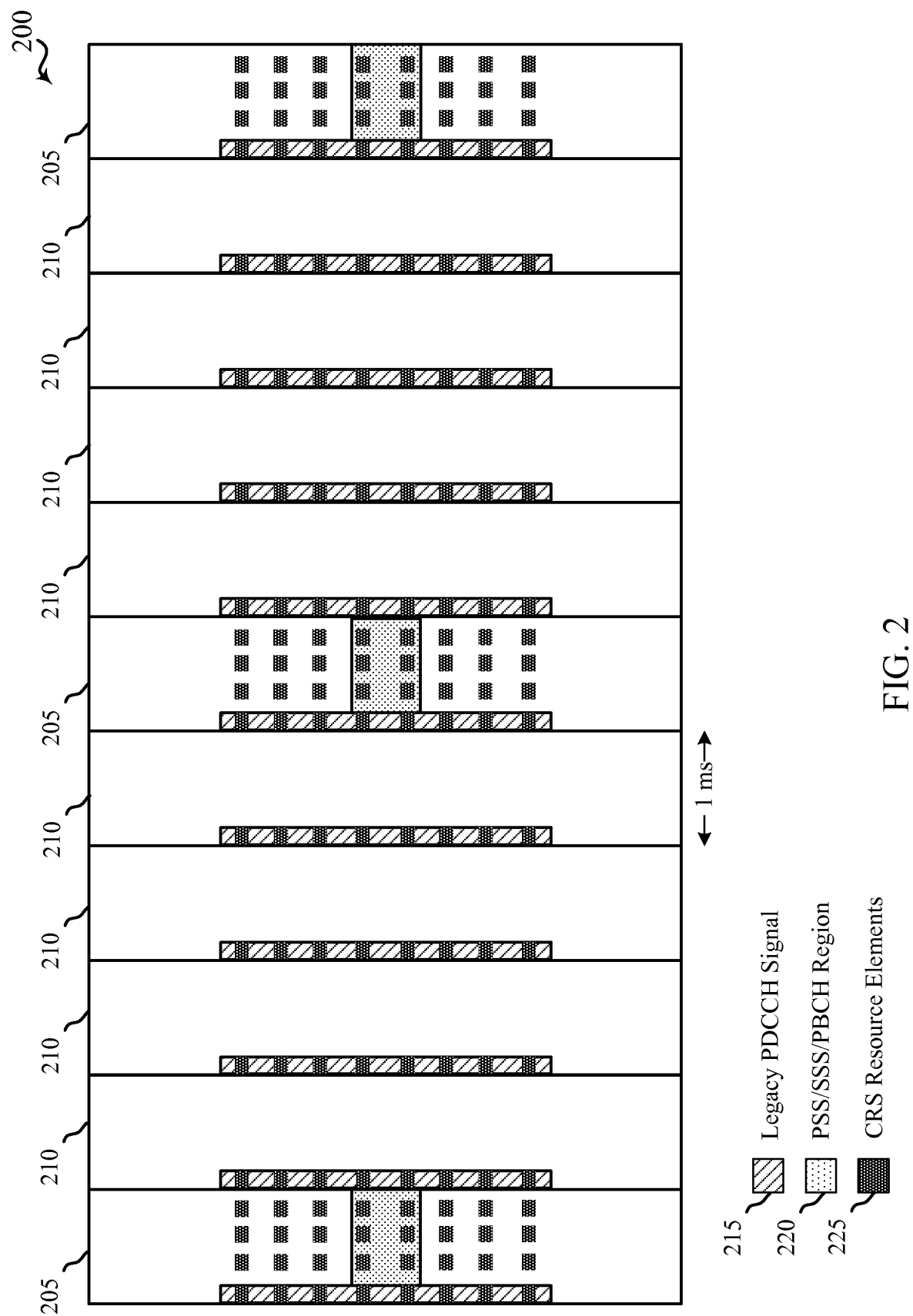
FIG. 2 is a diagram conceptually illustrating an example of a number of subframes and resources within subframes that may be reserved for legacy communications in a wireless communication system, in accordance with various aspects of the present disclosure.

FIG. 2 is a diagram conceptually illustrating an example of portions of radio frames 200 and different subframes 205 and 210 that may be transmitted. The radio frames of FIG. 2 may be transmitted using portions of the wireless communication system 100 described with reference to FIG. 1 between one or more base stations 105 and/or one or more UEs 115, for example. As mentioned above, different types of UEs (e.g., UEs 115 of FIG. 1) may be provided and may have different capabilities. For example, a legacy UE may be capable of transmitting and receiving communications according to legacy protocols, while other UEs may be capable of transmitting and receiving low latency or low duty cycle communications. In order to maintain compatibility with legacy UEs, the communications of each of the different communications types would need to retain a set of resources that are needed for legacy communications with legacy UEs.

FIG. 2 shows examples of various resources that may be transmitted according to raster spacing recognized by legacy UEs that provides for 1 ms subframes 205, 210 that make us a 10 ms radio frame. Within each subframe 205, 210, a physical downlink control channel (PDCCH) 215 is provided in the first symbol of the subframe 205, 210, which may provide various legacy control information. Every fifth subframe, indicated in FIG. 2 as subframes 205, for legacy communications may include certain types of synchronization and broadcast signaling that are expected by legacy UEs. Such signaling may include a primary synchronization signal (PSS), a secondary synchronization signal (SSS), and a physical broadcast channel (PBCH). This signaling is provided in a PSS/SSS/PBCH region 220, in the central six resource blocks of subframes 205. Furthermore, a common reference signal (CRS) 225 is transmitted within the PDCCH 215 and over at least a fraction of system bandwidth in the PSS/SSS subframes 205. These resources for legacy communications, according to various examples, may be reserved resources that are maintained to provide compatibility with legacy UEs. The remaining resources may then be shared between legacy channels and one or more other channels, such as low latency channels that provide low latency communications and/or low duty cycle channels that may provide low duty cycle communications.

Figure 3:
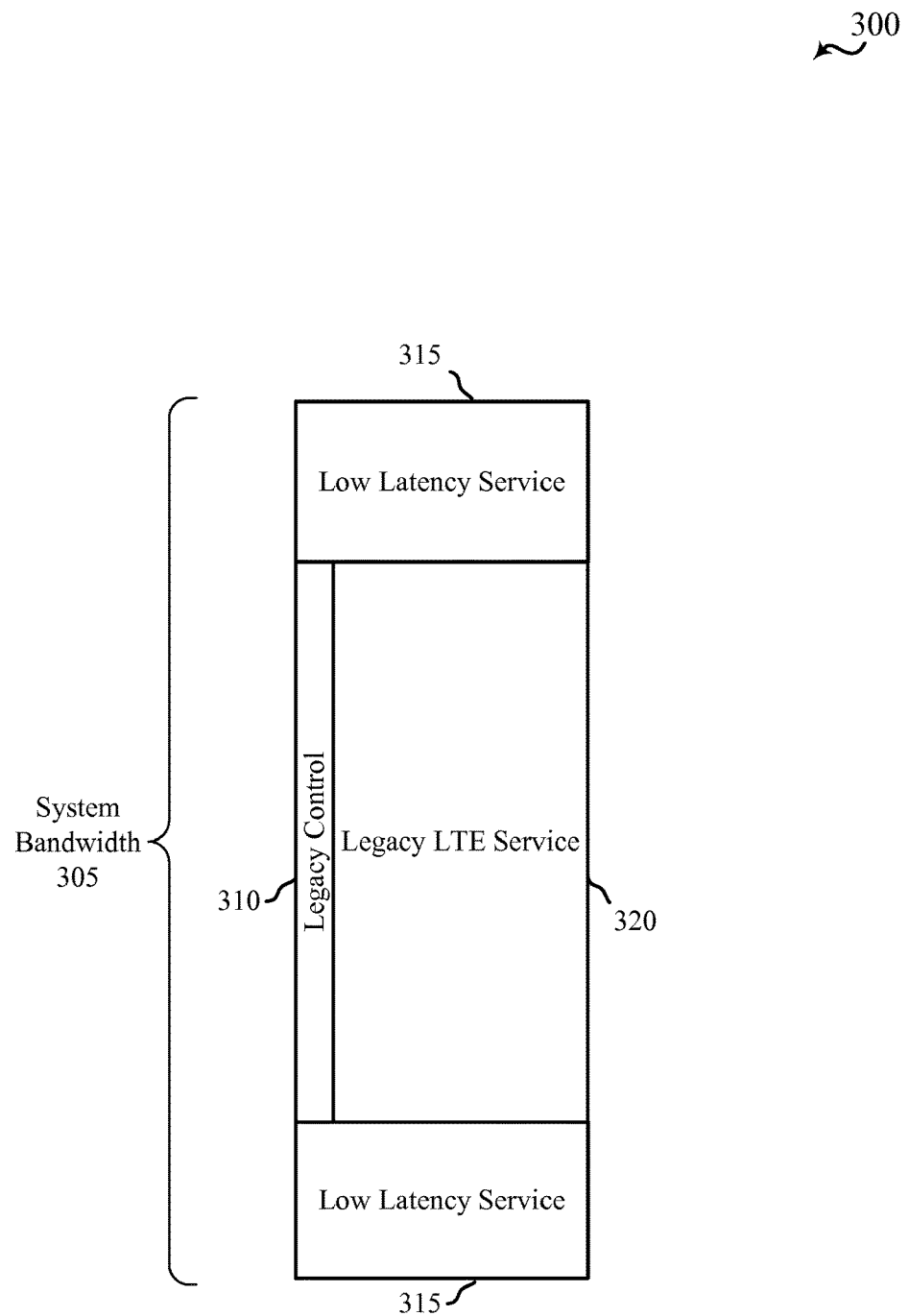
FIG. 3 is a diagram illustrating an example of resource partitioning that may be used in a wireless communication system, in accordance with various aspects of the present disclosure.

With reference now to FIG. 3, a block diagram 300 is described that conceptually illustrate examples of legacy communications and low latency communications using different resources of a wireless communication system, in accordance with aspects of the present disclosure. The communications of FIG. 3 may be transmitted using portions of the wireless communication system 100 described with reference to FIG. 1 between one or more base stations 105 (e.g., eNBs) and one or more UEs 115, for example. In the example of FIG. 3, wireless resources within a system bandwidth 305 may include a legacy control region 310, low latency service regions 315, and legacy LTE service region 320. Such a configuration may be used with either FDM or TDM communications. Legacy control region 310 may include, in certain examples, the first one or two symbols of each subframes, which may include various legacy control and signaling information. In some examples, the legacy control region may also include the center six resource blocks and CRS resource elements of certain subframes, such as discussed above with respect to FIG. 2.

Figure 4:
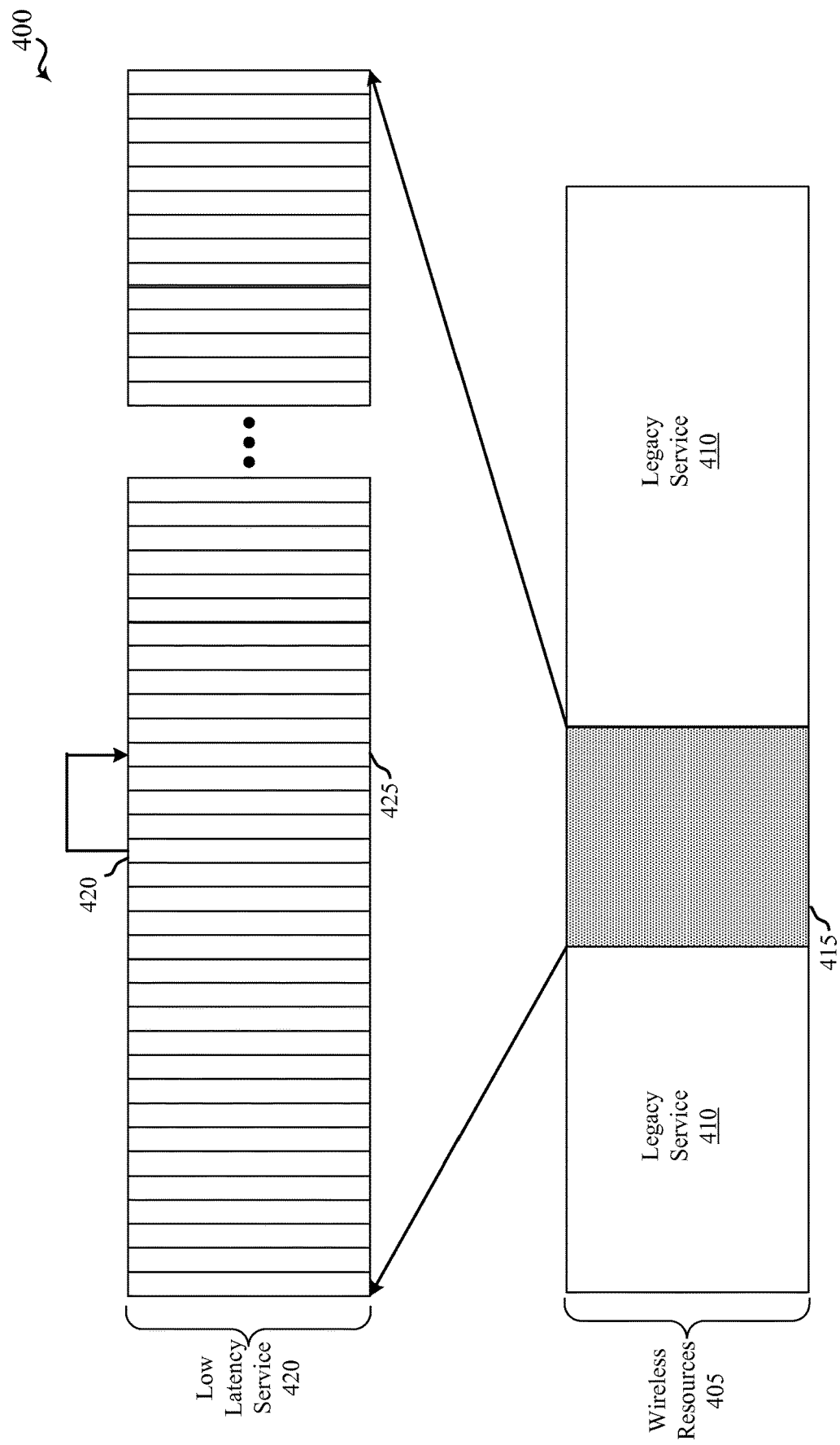
FIG. 4 is a diagram conceptually illustrating an example of radio frames for low latency and legacy communications that may transmitted using different resources of a wireless communication system, in accordance with various aspects of the present disclosure.

With respect to low latency type communications, FIG. 4 is a diagram 400 conceptually illustrating an example of different communications types in which certain wireless communication resources 405 may be configured to provide legacy and low latency mode access, in accordance with aspects of the present disclosure. The wireless resources 405 of FIG. 4 may be transmitted using portions of the wireless communication system 100 described with reference to FIG. 1 between one or more base stations 105 and one or more UEs 115, for example. In this example, a subset 410 of wireless communication resources 405 may provide legacy LTE service. A subset of wireless communication resources 405 may be configured for low latency communications, and may include subframes of the type that include additional symbols relative to legacy LTE subframes, or that may dynamically share legacy LTE and low latency mode communications. According to certain examples, low latency service 420 may include thin resource blocks (RBs), with each thin RB spanning one OFDM symbol in time and 144 consecutive subcarriers. Some resource elements (REs) within the thin RBs may be dedicated for UE reference signals (UE-RS), and some REs may be dedicated for PDCCH transmissions, with remaining REs within the thin RBs providing physical downlink shared channel (PDSCH) transmissions.

In some examples, the subset of resources 410 for legacy service may be configured to handle camping, mobility, and related tasks for a UE. The subset of resources 415 may be configured to provide low latency service 420 to UEs that are capable of transmitting and receiving such communications. Low latency service 420, in various examples, may be configured to provide acknowledgment of receipt of transmissions, such as an acknowledgment/negative acknowledgment (ACK/NACK) according to a HARQ scheme, on a significantly shorter time scale than such acknowledgments in legacy service 410. In some examples, symbol 420 may include data transmitted to a UE, and symbol 425 may be used to provide an acknowledgment of receipt of the transmission. In some examples, acknowledgment of receipt of communications may be provided in a first available symbol that is n+4 symbols following the transmission. In such a manner, acknowledgment may be provided relatively quickly, and any necessary retransmissions may be initiated in significantly less time than similar functions provided in legacy communications. For example, legacy communications may provide acknowledgment of receipt starting with the fourth subframe after a transmission, thus providing a minimum RTT of 4 ms, and low latency service 420 may have symbols with lower TTI than legacy symbols and provide for acknowledgment of receipt starting with the fourth symbol after a transmission, thus providing, in some examples, RTTs substantially less than 1 ms.

In some examples, resource assignments may be communicated using control signaling included in the subset of resources 410 for legacy service. For example, once an allocation of the subset of resources 415 is determined, this allocation may be transmitted to UEs using semi-static signaling, such as through a system information block (SIB) transmitted using the subset of resources. In some examples, the semi-static allocation of resources for the subset of resources 410 and the subset of resources 410 may be determined based on a number of factors including, for example, the types of UEs that are present at a particular time that are capable of receiving low latency service, the types of traffic flows that are to be provided to the different UEs (e.g., delay sensitive traffic versus delay insensitive traffic), system utilization, and/or channel conditions, to name a few.

In some examples, the semi-static allocation of resources may be dynamically modified to change a resource that is allocated for low latency communications back to legacy communications. Such dynamic re-allocation may be made on at least a portion of the subset of resources, and may be based at least in part on an amount of the low latency traffic to be transmitted between the base station and the at least one UE. For example, a base station may determine that an amount of data in a data queue for the low latency data service is below a threshold, and may dynamically re-allocate at least a portion of the subset 415 of wireless resources to provide legacy service. In further examples, a base station may receive a transmission from a UE that uplink data is to be transmitted using low latency communications, and the allocation of the subset of resources 415 may be determined based on the indication that low latency uplink communications are present.

The dynamic reallocation of resources, in some examples, may be provided through a presence indication channel (PIC) that indicates whether remaining wireless resources within a subframe are configured for low latency communications. The PIC may indicate, for example, a shape or an amount for the subset of the remaining wireless resources within a subframe that are configured for low latency communications, or whether the remaining wireless resources within a subframe are configured for low latency communications. The PIC may be included, in some examples, in one RE of a thin RB, and may carry information about the actual shape of the low latency segment. The shape of the low latency segment may be upper bounded by the nominal shape that is set forth in the semi-static signaling, and information in the PIC may indicate the actual shape for a particular resource. For example, a PIC signal that is "off" (e.g., a logical zero) may denote that the entire subset of low latency resources for a time period (e.g., a subframe) has been reclaimed by a default or legacy operation.

In some examples, if low latency service is to be provided, each subframe is allocated to include at least some low latency resources, and the PIC in such cases may indicate that these low latency resources are not needed and that legacy operation for these resources is provided. In some examples, a UE looking for a low latency resource may decode the PIC signal for that resource, and if the PIC decoded successfully the UE then infers the actual shape of the resource as well as PDCCH embedded in the resource, and the UE may then decode the PDCCH and PDSCH equivalent transmissions for the resources. For uplink transmissions, a base station may use the first PDCCH symbol to announce dynamic allocation of low latency resources for the next subframe period. Any previously issued uplink grants may be gated by the most recent low latency segment announcements. Thus, semi-static allocation of resources may be provided, that may be dynamically re-allocated based on actual traffic needs, which may provide flexibility in a wireless network to provide enhanced wireless communications.

Figure 5:
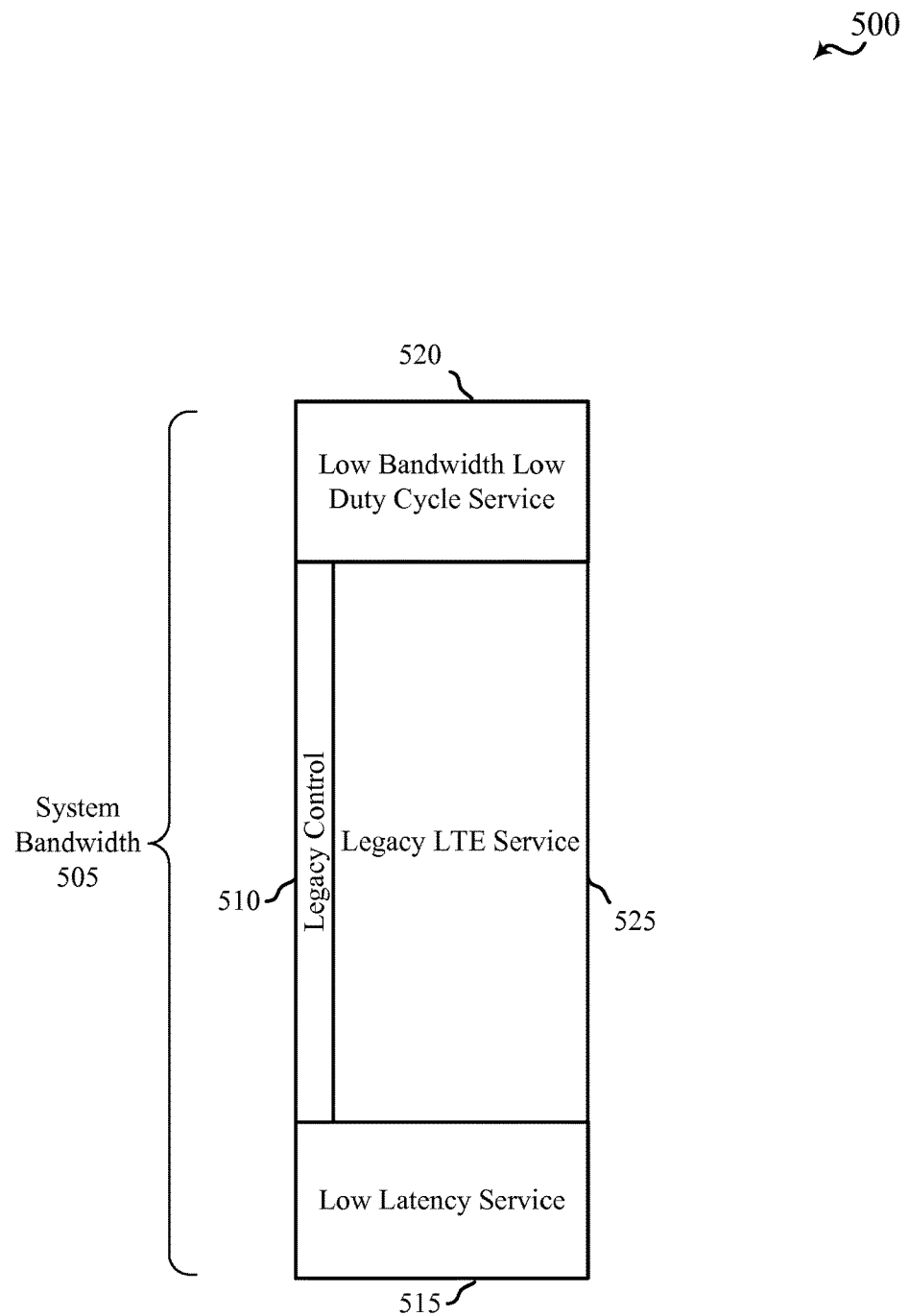
FIG. 5 is a diagram illustrating another example of resource partitioning that may be used in a wireless communication system, in accordance with various aspects of the present disclosure.

As mentioned above, in some examples low duty cycle services may be provided in a portion of available wireless communications resources outside of the resources reserved for legacy transmissions. FIG. 5 a block diagram 500 is described that conceptually illustrates examples of legacy communications and low duty cycle communications using different resources of a wireless communication system, in accordance with aspects of the present disclosure. The communications of FIG. 5 may be transmitted using portions of the wireless communication system 100 described with reference to FIG. 1 between one or more base stations 105 (e.g., eNodeBs (eNBs)) and one or more UEs 115, for example. In the example of FIG. 5, wireless resources within a system bandwidth 505 may include a legacy control region 510, low latency service region 515, a low bandwidth low duty cycle service region 520, and legacy LTE service region 525. Such a configuration may be used with either FDM or TDM communications. Legacy control region 510 may include, in certain examples, the first one or two symbols of each subframe, which may include various legacy control and signaling information such as discussed above. In some examples, the legacy control region 510 may also include the center six resource blocks and CRS resource elements of certain subframes, such as discussed above with respect to FIG. 2.

The low latency service region 515 may contain resources for low latency communications, such as discussed above. The low bandwidth low duty cycle (LBLD) service region 520 may include resources for LBLD communications having a duty cycle that is increased relative to legacy communications or low latency communications. In some cases, LBLD communications may also occupy a partial amount of the system bandwidth 505. In some examples, LBLD communications may be provided for MTC devices that, in turn, may be programmed to monitor only during relevant duty cycle periods and may therefore conserve power. Thus, LBLD communications may provide another subset of the wireless resources. In certain examples, the LBLD communications provide completely self-contained control and synchronization signaling sufficient for the MTC UE to receive the LBLD communications independently of the legacy or low latency type of communications, which have a duty cycle that is shorter and that may also occupy the full system bandwidth 505. In some examples, each LBLD segment 520 may include a number of consecutive RBs that repeat once every predetermined number of subframes. For example, each LBLD segment may include six consecutive RBs and repeat once every 10 subframes, thus providing a 10% duty cycle. In some examples, different UEs may be programmed for different duty cycles, and resources for LBLD communications may be allocated according to the duty cycle of devices that are present. For example, devices with a 20% duty cycle may result in an allocation of LBLD resources in two out of every 10 subframes, and devices with a 1% duty cycle may result in an allocation of LBLD resources in one out of every 100 subframes.

The allocation and signaling of LBLD resources may be provided in a similar manner as discussed above with respect to low latency resource allocations. Allocations of LBLD resources may be made semi-statically and resources may be dynamically re-allocated in a similar manner as discussed above. In examples where allocations are made for both low latency and LBLD communications, signaling may provide allocations and dynamic re-allocations of resources for either or both services. Additionally, in the event that other services may be allocated certain of the wireless communications resources, signaling may be provided to indicate any number of such additional services in a similar manner.

Figure 6:
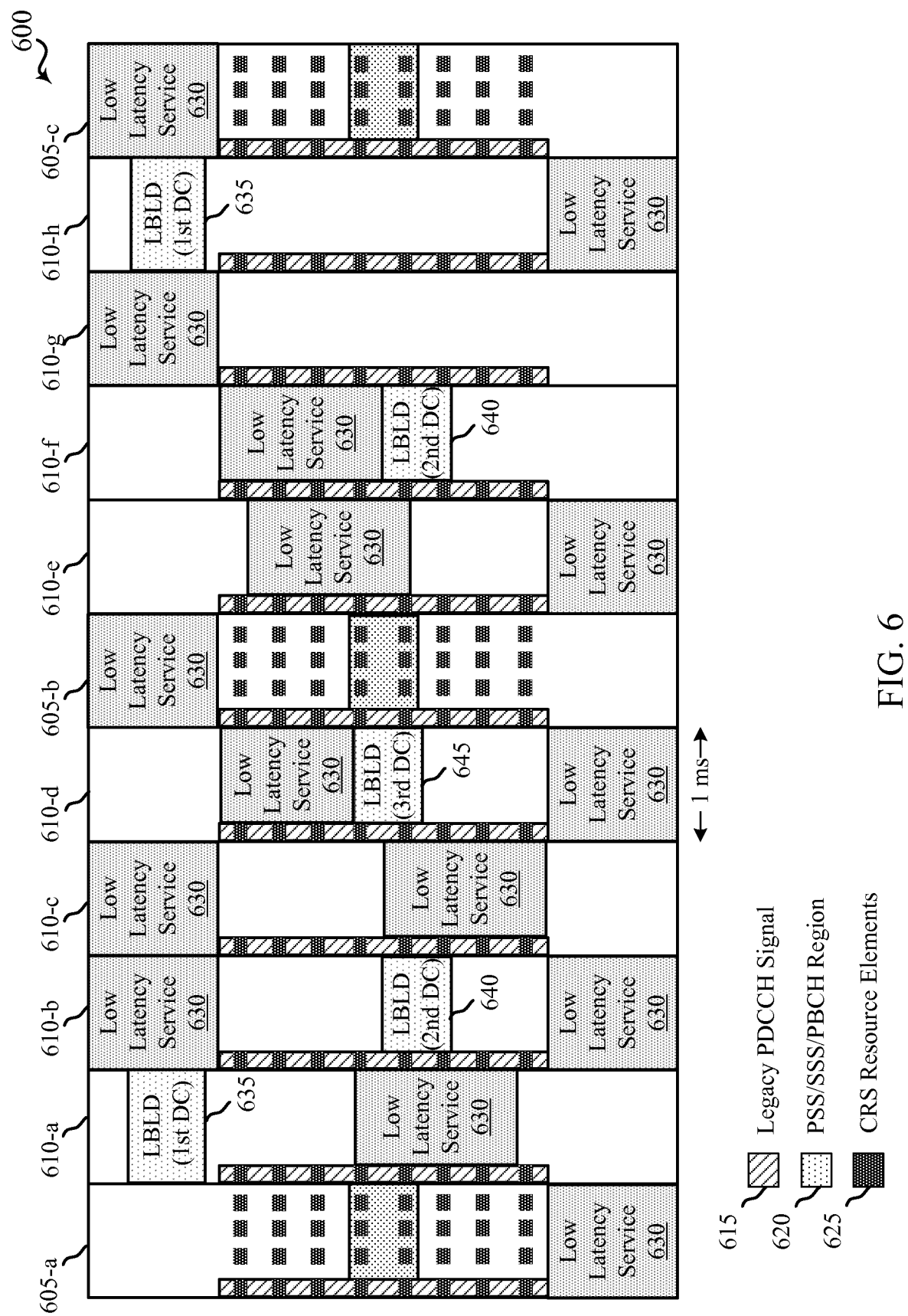
FIG. 6 is a diagram conceptually illustrating an example of a number of subframes and resources within subframes that may be reserved for legacy communications and other resources that may be allocated for other types of communications in a wireless communication system, in accordance with various aspects of the present disclosure.

FIG. 6 is a diagram conceptually illustrating an example of portions of radio frames 600 and different subframes 605 and 610 that may be transmitted. The radio frames of FIG. 6 may be transmitted using portions of the wireless communication system 100 described with reference to FIG. 1 between one or more base stations 105 and/or one or more UEs 115, for example. As mentioned above, different types of UEs (e.g., UEs 115 of FIG. 1) may be provided and may have different capabilities. For example, a legacy UE may be capable of transmitting and receiving communications according to legacy protocols, while other UEs may be capable of transmitting and receiving low latency communications, and MTC devices may be capable of transmitting and receiving according to low duty cycle communications.

FIG. 6 shows various wireless communications resources that may be transmitted according to various examples. In this example, legacy PDCCH signals 615, legacy PSS/SSS/PBCH regions 620, and legacy CRS REs 625 are indicated similarly as in FIG. 2, and are identified as reserved resources for a first type of communication (e.g., legacy communication with legacy UEs). In this example, a subset of the remaining wireless resources are allocated for a second type of communications with a second type of UE which, in the example of FIG. 6 includes low latency service resources 630 allocated for UEs that support low latency communications. As discussed above, in some examples when low latency resources are allocated in a system, each subframe may include some amount of low latency resources, and such resources may be different resources depending upon the particular subframe. For example, in subframe 610-*a* low latency service resources 630 may occupy a portion of the center six resource blocks of the subframe, while low latency service resources 630 allocated in subframes 605-*a*, 605-*b*, and 605-*c* are allocated so as to not occupy these reserved resources.

Additionally, in the example of FIG. 6, a number of LBLD resources 635 through 645 may also be allocated. In some examples, LBLD resources 635 may be allocated for UEs having a first duty cycle, LBLD resources 640 may be allocated for UEs having a second duty cycle, and LBLD resources 645 may be allocated for UEs having a third duty cycle. As discussed above, the duty cycle of a UE, such as a MTC device, may be defined such that the UE only has to monitor a channel for a limited time defined by the duty cycle of the device, which may allow for enhanced power efficiency of such devices. Thus, the waveform of FIG. 6 provides for multiple difference segments that may be used for multiple different communications types. It should be understood that the example of FIG. 6 is just one of many different examples, as will be readily recognized by one of skill in the art.

Figure 7:
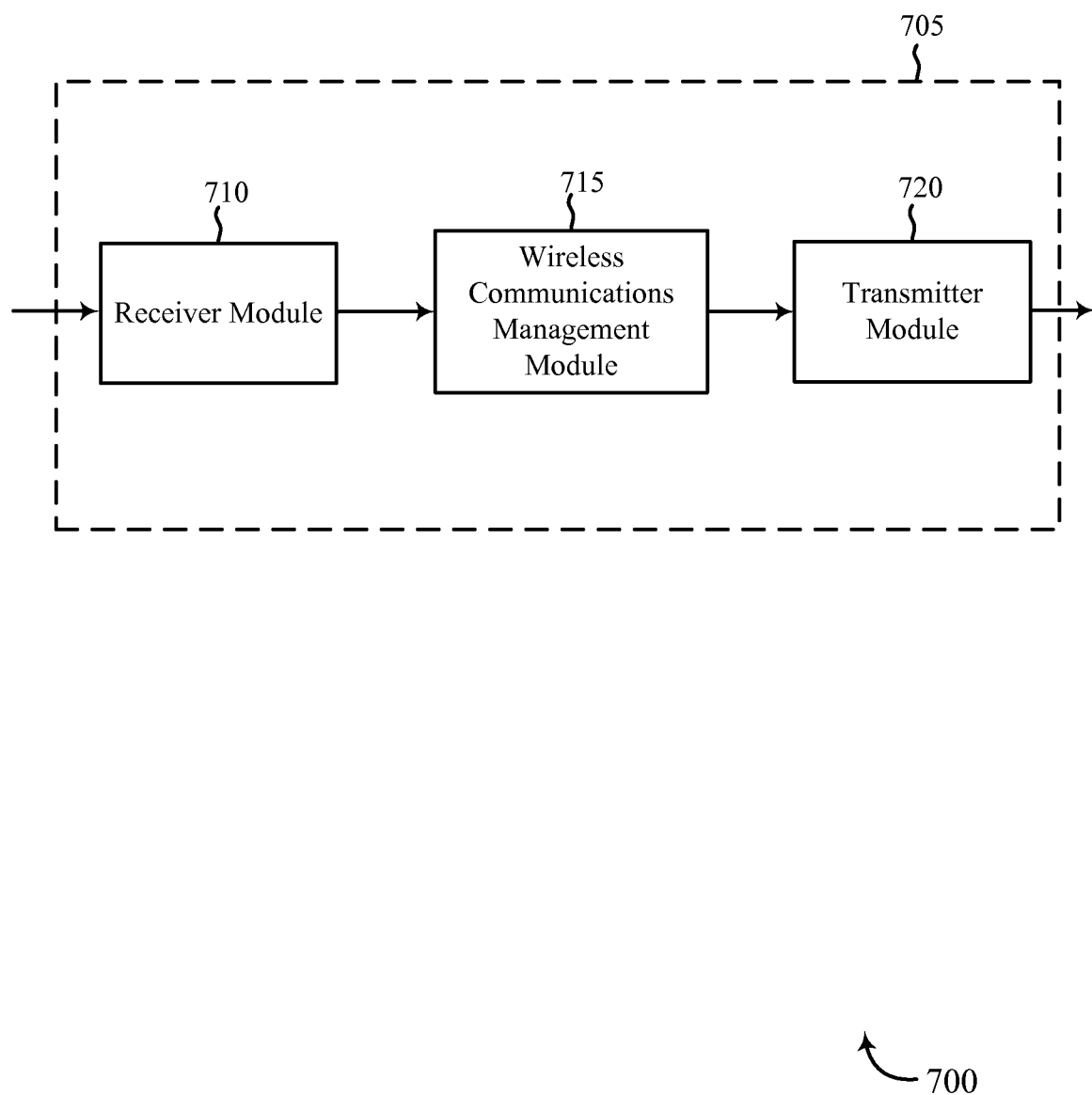
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1, for example. The device 705 may include a receiver module 710, a wireless communications management module 715, and/or a transmitter module 720. The device 705 may also be or include a processor (not shown). Each of these modules may be in communication with each other.

The modules depicted in device 705 may, individually or collectively, be implemented using one or more application-specific integrated circuits (ASICs) adapted to perform some or all of the applicable functions in hardware. Additionally or in the alternative, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 710 may receive information such as packets, user data, and/or control information associated with various information channels (e.g., control channels, data channels, etc.) and according to one or more different communications types (e.g., legacy LTE communications, low latency communications, LTE communications over unlicensed spectrum, NCT communications, etc.). The receiver module 710 may be configured to receive, for example, signaling indicating an allocation of resources for different types of communications. Information may be passed on to the wireless communications management module 715, and to other components of the device 705.

The wireless communications management module 715 may be configured to perform various functions related to identifying services and/or wireless resources connections to be used for communications according to different services at the device 405. This may include identifying allocated resources, identifying active services, and performing associated functions to transmit and receive communications according to the identified services and resources, which may be an example of the functions described above with reference to FIGS. 2-6.

The transmitter module 720 may transmit the one or more signals received from other components of the device 705. The transmitter module 720 may transmit wireless transmissions using allocated resources and according to the type of services that are identified by the wireless communications management module 715. In some examples, the transmitter module 720 may be collocated with the receiver module 710 in a transceiver module (not shown).

Figure 8:
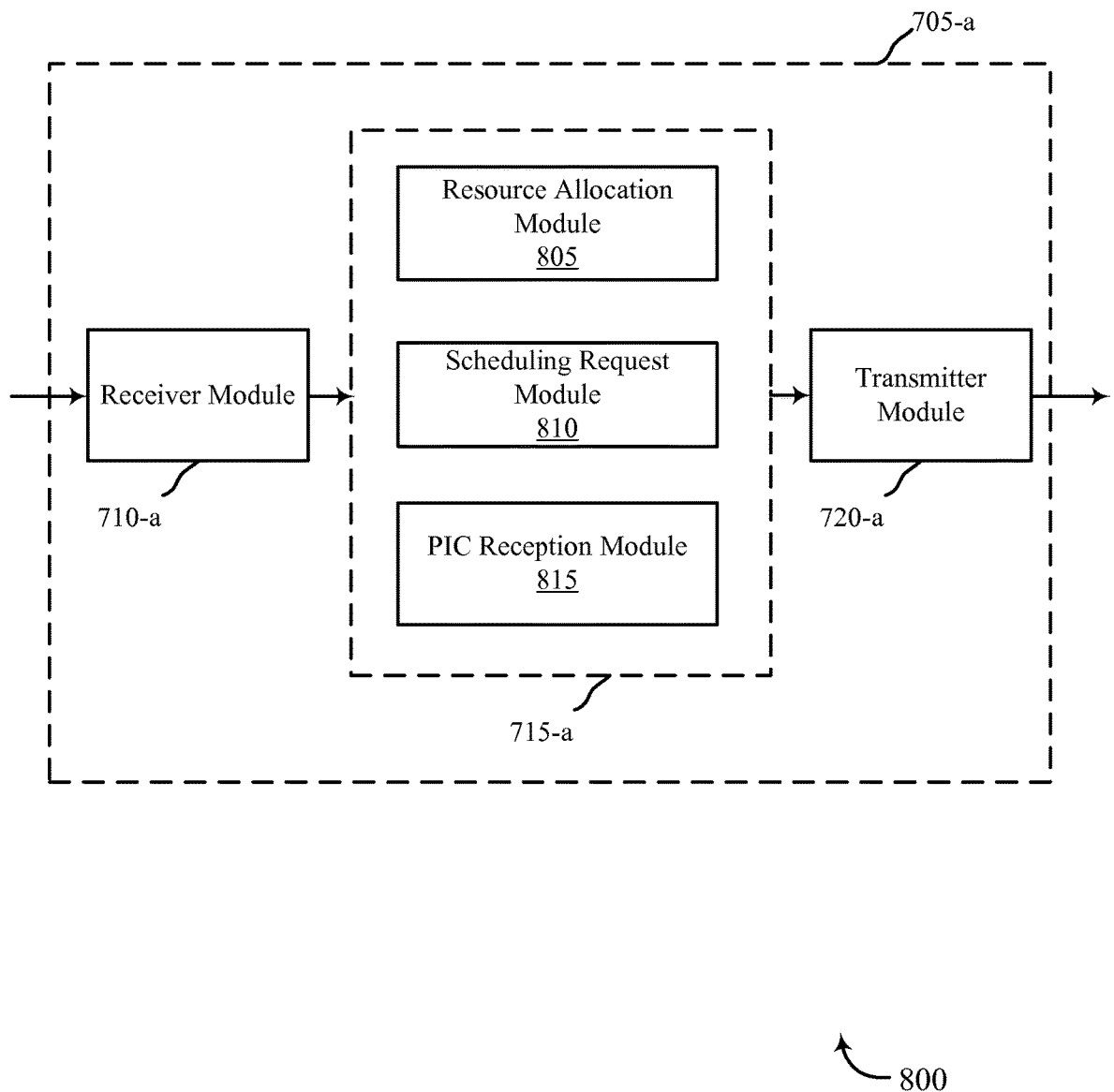
FIG. 8 shows a block diagram of a device configured for use in wireless communication, in accordance with various aspects of the present disclosure.

FIG. 8 shows a block diagram 800 of a device 705-*a* for use in wireless communication, in accordance with various examples. The device 705-*a* may be an example of one or more aspects of a UE 115 described with reference to FIG. 1. It may also be an example of a device 705 described with reference to FIG. 7. The device 705-*a* may include a receiver module 710-*a*, a wireless communications management module 715-*a*, and/or a transmitter module 720-*a*, which may be examples of the corresponding modules of device 705. The device 705-*a* may also include a processor (not shown). Each of these modules may be in communication with each other. The wireless communications management module 715-*a* may include a resource allocation module 805, a scheduling request module 810, and a presence indication channel (PIC) reception module. The receiver module 710-*a* and the transmitter module 720-*a* may perform the functions of the receiver module 710 and the transmitter module 720, of FIG. 7, respectively.

Within the wireless communications management module 715-*a*, resource allocation module 805 may determine resource allocations for one or more types of communications. For example, resource allocation module 805 may receive semi-static indications of resources allocated for legacy and low latency communications. Furthermore, in some examples, the resource allocation module 805 may receive dynamic re-allocations of the resources that device 705-*a* is to use for different types of communications, in a manner similarly as discussed above with respect to FIGS. 2-6. Scheduling request module 810, in some example, may determine that the device 705-*a* includes data to be transmitted according to different communications types, which may prompt a base station to provide resource allocations for the communication according to the communications type. PIC reception module 815, in some examples, may receive information in the PIC and may determine that one or more resources have been dynamically re-allocated to a different communication type.

Figure 9:
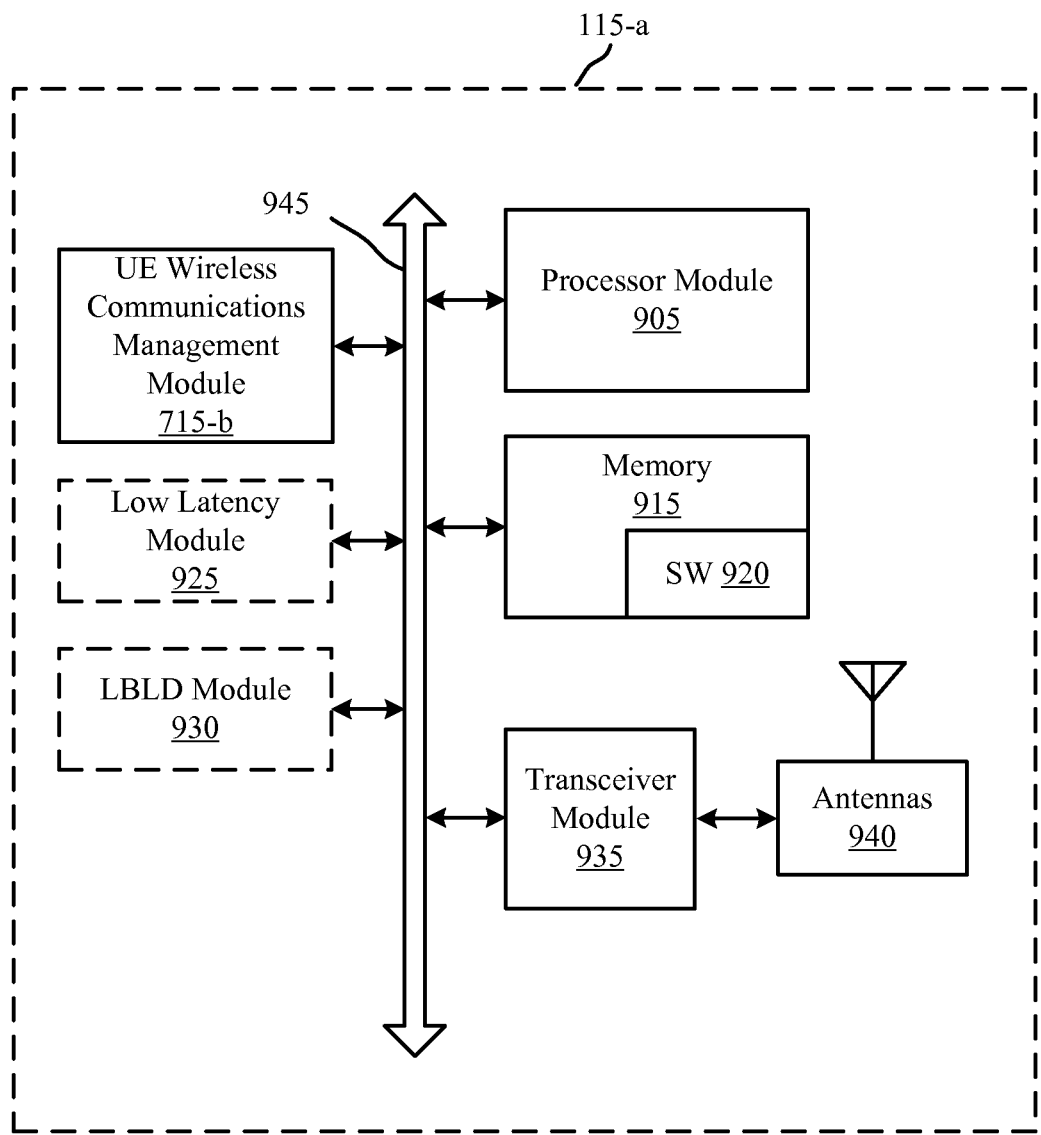
FIG. 9 shows a block diagram of a wireless communication system, in accordance with various aspects of the present disclosure.

FIG. 9 shows a system 900 for use in wireless communication, in accordance with various examples. System 900 may include a UE 115-*a*, which may be an example of the UEs 115 of FIG. 1. UE 115-*a* may also be an example of one or more aspects of devices 705 of FIGS. 7 and/or 8.

The UE 115-*a* may generally include components for bi-directional voice and data communications including components for transmitting communications and components for receiving communications. The UE 115-*a* may include antenna(s) 940, a transceiver module 935, a processor module 905, and memory 915 (including software (SW) 920), which each may communicate, directly or indirectly, with each other (e.g., via one or more buses 945). The transceiver module 935 may be configured to communicate bi-directionally, via the antenna(s) 940 and/or one or more wired or wireless links, with one or more networks, as described above. For example, the transceiver module 935 may be configured to communicate bi-directionally with base stations 105, such as discussed with reference to FIGS.

1-6. The transceiver module 935 may include a modem configured to modulate the packets and provide the modulated packets to the antenna(s) 940 for transmission, and to demodulate packets received from the antenna(s) 940. The transceiver module 935 may be capable of concurrently communicating with one or more base stations 105 via multiple component carriers.

The UE 115-*a* may include a UE wireless communications management module 715-*b*, which may perform the functions described above for the wireless communications management module 715 of device 705 of FIGS. 7 and 8. The UE 115-*a* may also include optional low latency module 925 that may handle operations related to low latency communications as discussed above with respect to FIGS. 2-6. The UE 115-*a* may also include optional LBLD module 930 that may handle operations related to LBLD communications as discussed above with respect to FIGS. 2-6.

The memory 915 may include random access memory (RAM) and read-only memory (ROM). The memory 915 may store computer-readable, computer-executable software/firmware code 920 containing instructions that are configured to, when executed, cause the processor module 905 to perform various functions described herein (e.g., resource allocation determination, dynamic re-allocation, and transmitting scheduling requests for services, etc.). Alternatively, the computer-readable, computer-executable software/firmware code 920 may not be directly executable by the processor module 905 but be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc.

Figure 10:
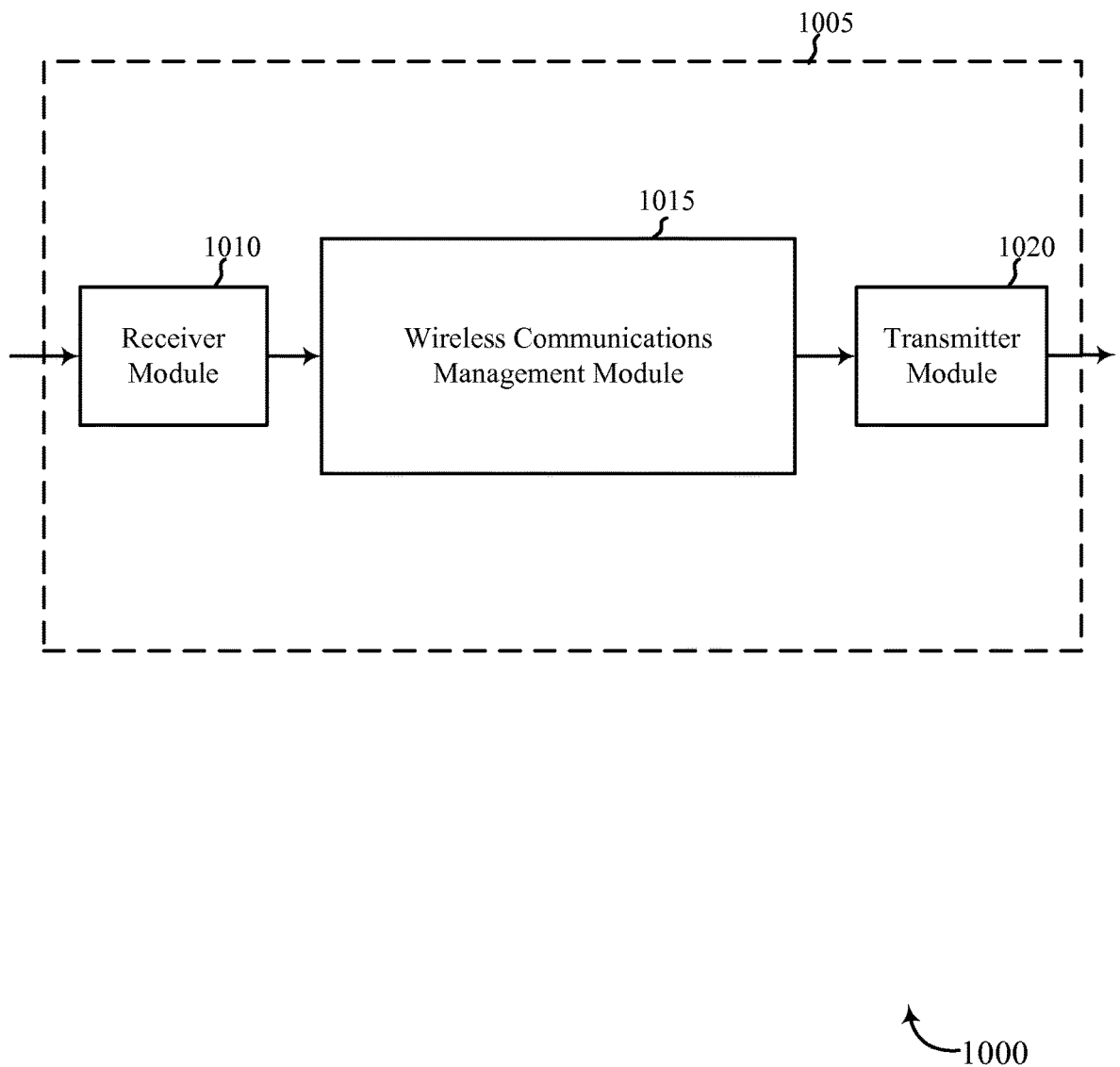
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1. In some examples, the apparatus 1005 may be part or include an LTE/LTE-A eNB and/or an LTE/LTE-A base station. The apparatus 1005 may also be a processor. The apparatus 1005 may include a receiver module 1010, a wireless communications management module 1015, and/or a transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010 may include at least one radio frequency (RF) receiver, such as an RF receiver operable to receive communications according to different communications types, for example. The receiver module 1010 may be used to receive various types of data and/or control signals (i.e., transmissions) over one or more communication links of a wireless communication system, such as one or more communication links of the wireless communication system 100 described with reference to FIG. 1.

In some examples, the transmitter module 1020 may include at least one RF transmitter, such as at least one RF transmitter operable to transmit communications according to different communications types, for example. The transmitter module 1020 may be used to transmit various types of data and/or control signals (i.e., transmissions) over one or more communication links of a wireless communication system, such as one or more communication links of the wireless communication system 100 described with reference to FIG. 1.

In some examples, the wireless communications management module 1015 perform various functions related to identifying services and/or wireless resource allocations to be used for communications according to different services at the apparatus 1005. This may include identifying allocated resources, identifying active services, and performing associated functions to transmit and receive communications according to the identified services and resources, which may be an example of the functions described above with reference to FIGS. 2-6.

Figure 11:
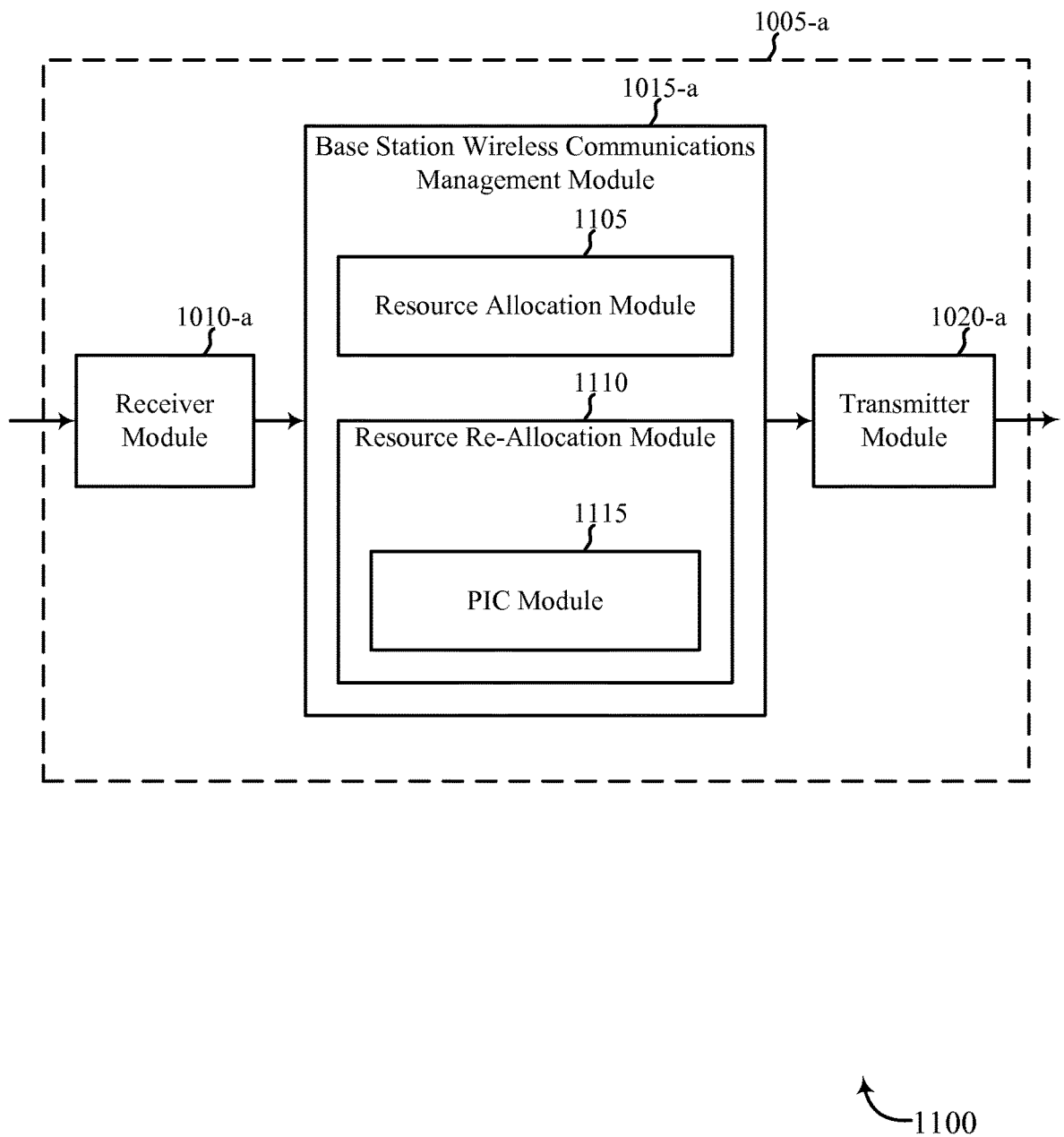
FIG. 11 shows a block diagram of an apparatus for use in wireless communication, in accordance with various aspects of the present disclosure.

FIG. 11 shows a block diagram 1100 of an apparatus 1005-*a* for use in wireless communication, in accordance with various aspects of the present disclosure. In some examples, the apparatus 1005-*a* may be an example of aspects of one or more of the base stations 105 described with reference to FIG. 1, and/or an example of aspects of the apparatus 1005 described with reference to FIG. 10. In some examples, the apparatus 1005-*a* may be part or include an LTE/LTE-A eNB and/or an LTE/LTE-A base station. The apparatus 1005-*a* may also be a processor. The apparatus 1005-*a* may include a receiver module 1010-*a*, a wireless communications management module 1015-*a*, and/or a transmitter module 1020-*a*. Each of these modules may be in communication with each other.

The components of the apparatus 1005-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010-*a* may be an example of one or more aspects of the receiver module 1010 described with reference to FIG. 10. In some examples, the receiver module 1010-*a* may include at least one radio frequency (RF) receiver, such as at least one RF receiver operable to receive communications according to different communications types. The receiver module 1010-*a* may be used to receive various types of data and/or control signals (i.e., transmissions) over one or more communication links of a wireless communication system, such as one or more communication links of the wireless communication system 100 described with reference to FIG. 1.

In some examples, the transmitter module 1020-*a* may be an example of one or more aspects of the transmitter module 1020 described with reference to FIG. 10. In some examples, the transmitter module 1020-*a* may include at least one RF transmitter, such as at least one RF transmitter operable to transmit communications according to different communications types. The transmitter module 1020-*a* may be used to transmit various types of data and/or control signals (i.e., transmissions) over one or more communication links of a wireless communication system, such as one or more communication links of the wireless communication system 100 described with reference to FIG. 1.

Within the wireless communications management module 715-*a*, resource allocation module 1105 may determine resource allocations for one or more types of communications. For example, resource allocation module 1105 may allocate semi-static resources allocated for legacy, low latency communications, and LBLD communications. Furthermore, in some examples, resource re-allocation module 1110 may determine dynamic re-allocations of the resources that apparatus 1005-*a* is to use for different types of communications, in a manner similarly as discussed above with respect to FIGS. 2-6. PIC module 1115, in some examples, may provide the PIC based on, for example, dynamic determinations of data to be transmitted by apparatus 1005-*a*, UEs 115, and devices 705, and may determine one or more resources are to be dynamically re-allocated to a different communication type, and include the indication in the PIC.

Figure 12:
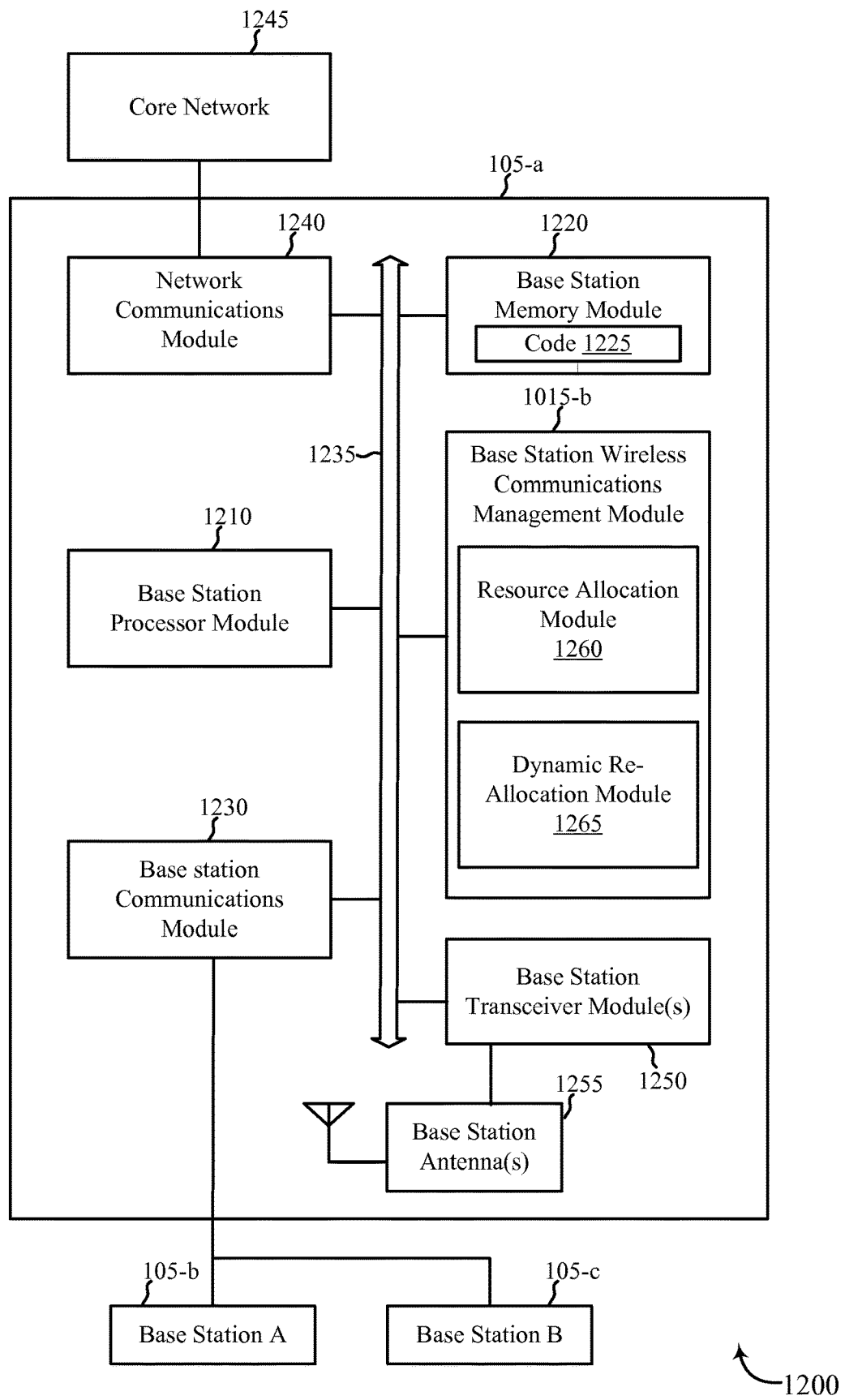
FIG. 12 shows a block diagram of a base station (e.g., a base station forming part or all of an eNB) for use in wireless communication, in accordance with various aspects of the present disclosure.

FIG. 12 shows a block diagram 1200 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, and/or aspects of one or more of the apparatus 1005 when configured as a base station, as described with reference to FIGS. 10 and/or 11. The base station 105-*a* may be configured to implement or facilitate at least some of the base station and/or apparatus features and functions described with reference to FIGS. 2-11.

The base station 105-*a* may include a base station processor module 1210, a base station memory module 1220, at least one base station transceiver module (represented by base station transceiver module(s) 1250), at least one base station antenna (represented by base station antenna(s) 1255), and/or a base station wireless communications management module 1015-*b*. The base station 105-*a* may also include one or more of a base station communications module 1230 and/or a network communications module 1240. Each of these modules may be in communication with each other, directly or indirectly, over one or more buses 1235.

The base station memory module 1220 may include random access memory (RAM) and/or read-only memory (ROM). The base station memory module 1220 may store computer-readable, computer-executable software/firmware code 1225 containing instructions that are configured to, when executed, cause the base station processor module 1210 to perform various functions described herein related to wireless communication (e.g., resource allocation, resource re-allocation, etc.). Alternatively, the computer-readable, computer-executable software/firmware code 1225 may not be directly executable by the base station processor module 1210 but be configured to cause the base station 105-*a* (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 105-*b* and 105-*c*, and/or to the network communications module 1240 for transmission to a core network 1245, which may be an example of one or more aspects of the core network 130 described with reference to FIG. 1. The base station processor module 1210 may handle, alone or in connection with the base station wireless communications management module 1015-*b*, various aspects of resource allocation and dynamic re-allocation such as discussed above with respect to FIGS. 2-6.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIG. 1. The base station 105-*a* may, for example, include multiple base station antennas 1255 (e.g., an antenna array). The base station 105-*a* may communicate with the core network 1245 through the network communications module 1240. The base station 105-*a* may also communicate with other base stations, such as the base stations 105-*b* and 105-*c*, using the base station communications module 1230.

The base station wireless communications management module 1015-*b* may be configured to perform and/or control some or all of the features and/or functions described with reference to FIGS. 2-6 related to resource allocation, identification of services to be provided, and resource re-allocation. The base station wireless communications management module 1015-*b*, or portions of the module 1015-*b*, may include a processor, and/or some or all of the functions of the base station wireless communications management module 1015-*b* may be performed by the base station processor module 1210 and/or in connection with the base station processor module 1210. In some examples, the base station wireless communications management module 1015-*b* may be an example of the base station wireless communications management module 1015 and/or 1015-*a* described with reference to FIGS. 10 and/or 11.

Figure 13:
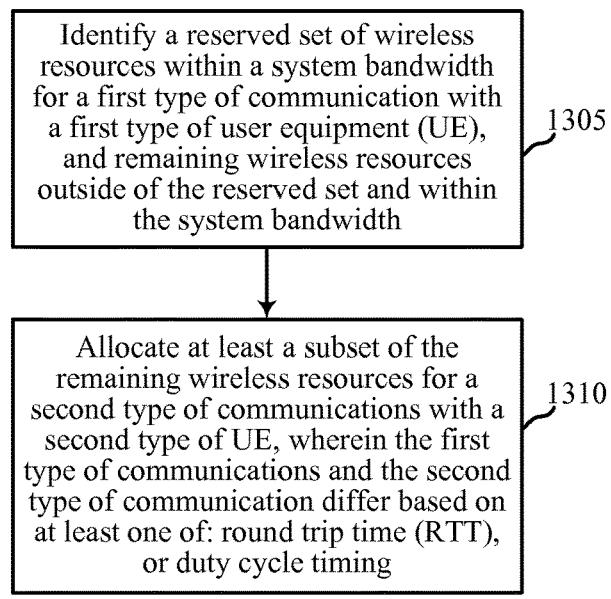
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105, described with reference to FIGS. 1 and/or 12, and/or aspects of one or more of the devices described with reference to FIGS. 10 and/or 11. In some examples, a base station may execute one or more sets of codes to control the functional elements of the base station to perform the functions described below. Additionally or alternatively, the base station may perform one or more of the functions described below using special-purpose hardware.

At block 1305, the method 1300 may include identifying a reserved set of wireless resources within a system bandwidth for a first type of communication with a first type of user equipment (UE), and remaining wireless resources outside of the reserved set and within the system bandwidth. The operations of block 1305 may be performed by, for example, transmitter module 1020 and/or the wireless communications management module 1015 of FIGS. 10, 11, and/or 12 and/or associated receivers/antennas.

At block 1310, the method may include allocating at least a subset of the remaining wireless resources for a second type of communications with a second type of UE. The first type of communications and the second type of communication differ based on at least one of round trip time (RTT), or duty cycle timing, for example. The operation(s) at block 1310 may be performed by, for example, transmitter module 1020 and/or the wireless communications management module 1015 of FIGS. 10, 11, and/or 12 and/or associated receivers/antennas. An example structural implementation of transmitter module 1020 may be base station transceiver module 1250 and base station antenna(s) 1255 of FIG. 12.

Thus, the method 1300 may provide for wireless communication. It should be noted that the method 1300 is just one implementation and that the operations of the method 1300 may be rearranged or otherwise modified such that other implementations are possible.

Figure 14:
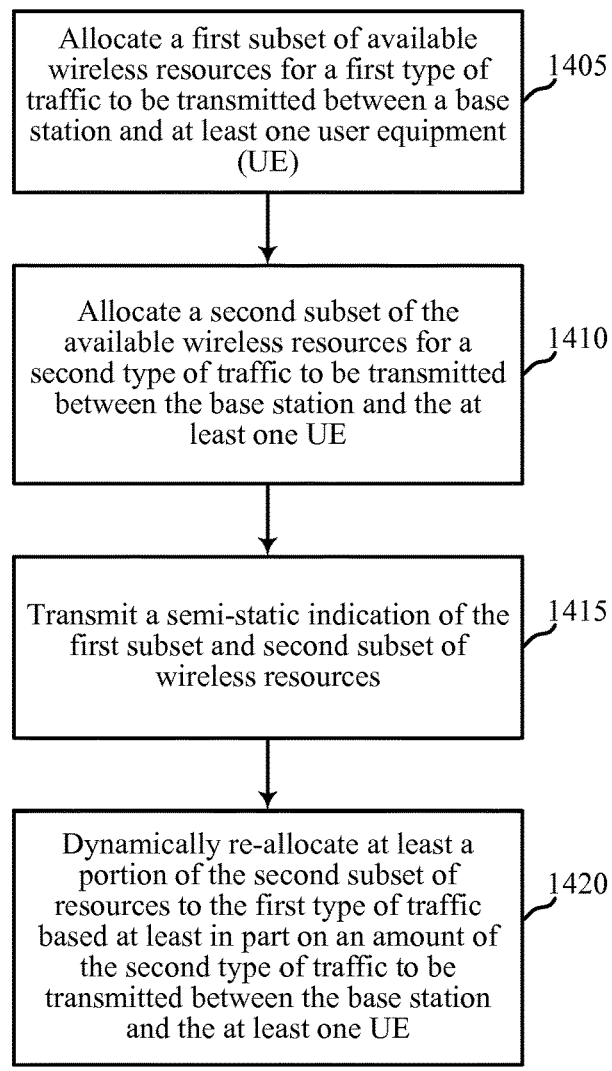
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105, described with reference to FIGS. 1 and/or 12, and/or aspects of one or more of the devices described with reference to FIGS. 10 and/or 11. In some examples, a base station may execute one or more sets of codes to control the functional elements of the base station to perform the functions described below. Additionally or alternatively, the base station may perform one or more of the functions described below using special-purpose hardware.

At block 1405, the method 1400 may include allocating a subset of available wireless resources for a first type of traffic to be transmitted between a base station and at least one user equipment (UE). The operations of block 1405 may be performed by, for example, transmitter module 1020 and/or the wireless communications management module 1015 of FIGS. 10, 11, and/or 12 and/or associated receivers/antennas.

At block 1410, the method may include allocating a subset of the available wireless resources for a second type of traffic to be transmitted between the base station and the at least one UE. The operation(s) at block 1410 may be performed by, for example, transmitter module 1020 and/or the wireless communications management module 1015 of FIGS. 10, 11, and/or 12 and/or associated receivers/antennas.

At block 1415, the method may include transmitting a semi-static indication of the subset and subset of wireless resources. The operation(s) at block 1415 may be performed by, for example, transmitter module 1020 and/or the wireless communications management module 1015 of FIGS. 10, 11, and/or 12 and/or associated receivers/antennas.

At block 1420, the method may include dynamically re-allocating at least a portion of the subset of resources to the first type of traffic based at least in part on an amount of the second type of traffic to be transmitted between the base station and the at least one UE. The operation(s) at block 1420 may be performed by, for example, transmitter module 1020 and/or the wireless communications management module 1015 of FIGS. 10, 11, and/or 12 and/or associated receivers/antennas. An example structural implementation of transmitter module 1020 may be base station transceiver module 1250 and base station antenna(s) 1255 of FIG. 12.

Thus, the method 1400 may provide for wireless communication. It should be noted that the method 1400 is just one implementation and that the operations of the method 1400 may be rearranged or otherwise modified such that other implementations are possible.

Figure 15:
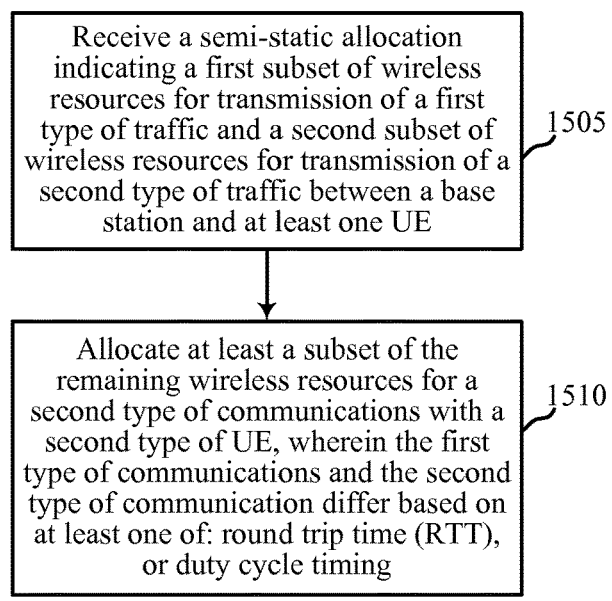
FIG. 15 is a flow chart illustrating another example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, described with reference to FIGS. 1 and/or 9, and/or aspects of one or more of the devices described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving a semi-static allocation indicating a subset of wireless resources for transmission of a first type of traffic and a subset of wireless resources for transmission of a second type of traffic between a base station and at least one UE. The operations of block 1505 may be performed by, for example, transmitter module 1020 and/or the wireless communications management module 715 of FIGS. 7, 8, and/or 9 and/or associated receivers/antennas.

At block 1510, the method may include receiving a dynamic re-allocation of at least a portion of the subset of resources to the first type of traffic based at least in part on an amount of the second type of traffic to be transmitted between the base station and the at least one UE. In some examples, the first type of traffic may have a first subframe type with a first round trip time (RTT), and the second type of traffic may have a second subframe type with a second RTT that is less than the first RTT. The operation(s) at block 1510 may be performed by, for example, transmitter module 1020 and/or the wireless communications management module 715 of FIGS. 7, 8, and/or 9 and/or associated receivers/antennas. An example structural implementation of transmitter module 1020 may be base station transceiver module 1250 and base station antenna(s) 1255 of FIG. 12.

Thus, the method 1500 may provide for wireless communication. It should be noted that the method 1500 is just one implementation and that the operations of the method 1500 may be rearranged or otherwise modified such that other implementations are possible.

Figure 16:
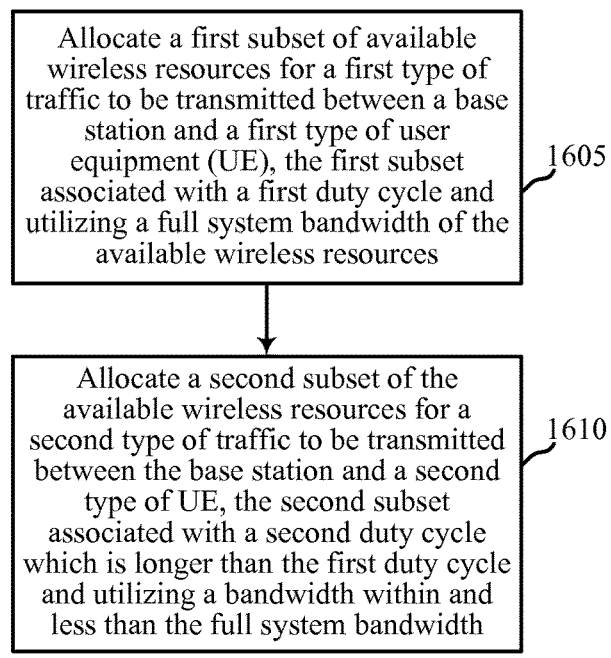
FIG. 16 is a flow chart illustrating another example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, described with reference to FIGS. 1 and/or 12, and/or aspects of one or more of the devices described with reference to FIGS. 10 and/or 11. In some examples, a base station may execute one or more sets of codes to control the functional elements of the base station to perform the functions described below. Additionally or alternatively, the base station may perform one or more of the functions described below using special-purpose hardware.

At block 1605, the method 1600 may include allocating a subset of available wireless resources for a first type of traffic to be transmitted between a base station and a first type of user equipment (UE), the subset associated with a first duty cycle and utilizing a full system bandwidth of the available wireless resources. The operations of block 1605 may be performed by, for example, transmitter module 1020 and/or the wireless communications management module 1015 of FIGS. 10, 11, and/or 12 and/or associated receivers/antennas.

At block 1610, the method may include allocating a subset of the available wireless resources for a second type of traffic to be transmitted between the base station and a second type of UE, the subset associated with a second duty cycle which is longer than the first duty cycle and utilizing a bandwidth within and less than the full system bandwidth. The operation(s) at block 1610 may be performed by, for example, transmitter module 1020 and/or the wireless communications management module 1015 of FIGS. 10, 11, and/or 12 and/or associated receivers/antennas. An example structural implementation of transmitter module 1020 may be base station transceiver module 1250 and base station antenna(s) 1255 of FIG. 12.

Thus, the method 1600 may provide for wireless communication. It should be noted that the method 1600 is just one implementation and that the operations of the method 1600 may be rearranged or otherwise modified such that other implementations are possible.

Figure 17:
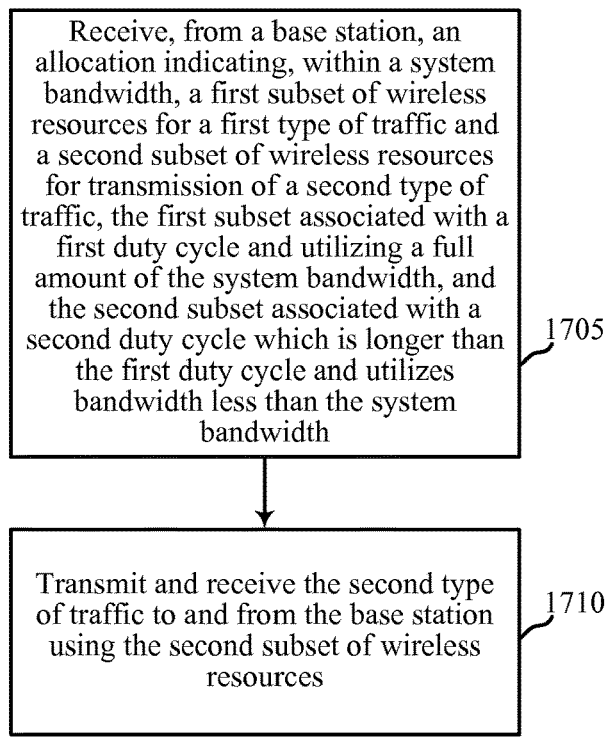
FIG. 17 is a flow chart illustrating another example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, described with reference to FIGS. 1 and/or 9, and/or aspects of one or more of the devices described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include receiving, from a base station, an allocation indicating, within a system bandwidth, a subset of wireless resources for a first type of traffic and a subset of wireless resources for transmission of a second type of traffic. The subset may be associated with a first duty cycle and utilize a full amount of the system bandwidth, and the subset may be associated with a second duty cycle which is longer than the first duty cycle and utilizes bandwidth less than the system bandwidth. The operations of block 1705 may be performed by, for example, receiver module 710 and/or the wireless communications management module 715 of FIGS. 7, 8, and/or 9 and/or associated receivers/antennas.

At block 1710, the method may include transmitting and receiving the second type of traffic to and from the base station using the subset of wireless resources. The operation(s) at block 1710 may be performed by, for example, receiver module 710 and/or transmitter module 720 and/or the wireless communications management module 715 of FIGS. 7, 8, and/or 9 and/or associated receivers/antennas. An example structural implementation of receiver module 710 or transmitter module 720 may be UE transceiver module 935 and UE antenna(s) 940 of FIG. 9.

Thus, the method 1700 may provide for wireless communication. It should be noted that the method 1700 is just one implementation and that the operations of the method 1700 may be rearranged or otherwise modified such that other implementations are possible.

In some examples, aspects from two or more of the methods 1300 through 1700 may be combined. It should be noted that the methods 1400, 1500, 1600, and 1700 are just example implementations, and that the operations of the methods 1400-1700 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and the claims included herewith. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying a reserved set of wireless resources within a system bandwidth for a first type of communication with a first type of user equipment (UE), and remaining wireless resources that are separate from the reserved set and are within the system bandwidth;
   allocating at least a subset of the remaining wireless resources for a second type of communication with a second type of UE, wherein the first type of communication has a first transmit time interval (TTI), and the second type of communication has a second TTI that differs from the first TTI;
   determining that the subset of the remaining wireless resources for the second type of communication is not configured during a first subframe; and
   transmitting an indication that the subset of the remaining wireless resources for the second type of communication is configured during a second subframe that differs from the first subframe.

2. The method of claim 1, wherein the first type of communication and the second type of communication differ based on RTT, and wherein:
   the first type of communication has a first subframe type with a first RTT, and the second type of communication has a second subframe type with a second RTT that is less than the first RTT.

3. The method of claim 1, wherein the first type of communication and the second type of communication differ based on duty cycle timing, and wherein:
   the first type of communication is associated with a first duty cycle and utilizes either a partial or a full amount of the system bandwidth, and the second type of communication is associated with a second duty cycle less than the first duty cycle and utilizes a bandwidth less than the system bandwidth.

4. The method of claim 1, wherein the allocating comprises:
   identifying a presence of at least one of the second type of UE;
   identifying a type of data service to be provided to the identified at least one of the second type of UE; and
   determining the subset of the remaining wireless resources based at least in part on the type of data service to be provided to the second type of UE.

5. The method of claim 1, further comprising:
   determining that an amount of data in a data queue for data service to be provided to the second type of UE is below a threshold; and
   dynamically re-allocating at least a portion of the subset of the remaining wireless resources to provide the first type of communication based at least in part on the determining.

6. The method of claim 1, further comprising:
   receiving a transmission from the second type of UE that uplink data is to be transmitted using the second type of communication; and
   wherein the allocating is based at least in part on the transmission from the second type of UE.

7. The method of claim 1, wherein the allocating is performed semi-statically based on one or more of a presence of the second type of UE or a type of data service.

8. The method of claim 1, wherein the first indication indicates the subset of the remaining wireless resources.

9. The method of claim 1, wherein the first indication comprises:
a presence indication channel that indicates that the subset of the remaining wireless resources within the first subframe is not configured for the second type of communication.

10. The method of claim 1, wherein the first indication comprises:
a presence indication channel that indicates a shape or an amount for the subset of the remaining wireless resources within the first subframe that is not configured for the second type of communication.

11. The method of claim 1, further comprising:
allocating another subset of wireless communication resources from the remaining wireless resources for a third type of communication with a third type of UE, the other subset of resources being different from the subset of the remaining wireless resources; and
transmitting an indication of the subset of the remaining wireless resources and the other subset of resources to one or more of the second type of UE and the third type of UE.

12. The method of claim 11, wherein the second type of UE comprises a machine-type communication (MTC) UE.

13. The method of claim 12, wherein the other subset of the remaining wireless resources comprises control and synchronization signaling sufficient for the MTC UE to receive the second type of communication independently of the first type of communication.

14. An apparatus for wireless communication, comprising:
means for identifying a reserved set of wireless resources within a system bandwidth for a first type of communication with a first type of user equipment (UE), and remaining wireless resources that are separate from the reserved set and are within the system bandwidth;
means for allocating at least a subset of the remaining wireless resources for a second type of communication with a second type of UE, wherein the first type of communication has a first transmit time interval (TTI), and the second type of communication has a second TTI that differs from the first TTI;
means for determining that the subset of the remaining wireless resources for the second type of communication is not configured during a first subframe; and
means for transmitting an indication that the subset of the remaining wireless resources for the second type of communication is configured during a second subframe that differs from the first subframe.

15. An apparatus for wireless communication, comprising:
a processor;
memory coupled to the processor; and
instructions stored in the memory, the instructions being executable by the processor to:
identify a reserved set of wireless resources within a system bandwidth for a first type of communication with a first type of user equipment (UE), and remaining wireless resources that are separate from the reserved set and are within the system bandwidth;
allocate at least a subset of the remaining wireless resources for a second type of communication with a second type of UE, wherein the first type of communication has a first transmit time interval (TTI), and the second type of communication has a second TTI that differs from the first TTI;

determine that the subset of the remaining wireless resources for the second type of communication is not configured during a first subframe; and
transmit an indication that the subset of the remaining wireless resources for the second type of communication is configured during a second subframe that differs from the first subframe.

16. The apparatus of claim 15, wherein the first type of communication and the second type of communication differ based on RTT, and wherein:
the first type of communication has a first subframe type with a first RTT, and the second type of communication has a second subframe type with a second RTT that is less than the first RTT.

17. The apparatus of claim 15, wherein the first type of communication and the second type of communication differ based on duty cycle timing, and wherein the instructions are further executable by the processor to:
associate the first type of communication with a first duty cycle and utilize either a partial or a full amount of the system bandwidth, and
associate the second type of communication with a second duty cycle less than the first duty cycle and utilize a bandwidth less than the system bandwidth.

18. The apparatus of claim 15, wherein the instructions are further executable by the processor to:
identify a presence of at least one of the second type of UE;
identify a type of data service to be provided to the identified at least one of the second type of UE; and
determine the subset of the remaining wireless resources based at least in part on the type of data service to be provided to the second type of UE.

19. The apparatus of claim 15, wherein the instructions are further executable by the processor to:
determine that an amount of data in a data queue for data service to be provided to the second type of UE is below a threshold; and
dynamically re-allocate at least a portion of the subset of the remaining wireless resources to provide the first type of communication based at least in part on the determining.

20. The apparatus of claim 15, wherein the instructions are further executable by the processor to:
receive a transmission from the second type of UE that uplink data is to be transmitted using the second type of communication; and
allocate based at least in part on the transmission from the second type of UE.

21. The apparatus of claim 15, wherein the instructions are further executable by the processor to:
perform allocation semi-statically based on one or more of a presence of the second type of UE or a type of data service.

22. The apparatus of claim 15, wherein
the first indication indicates the subset of the remaining wireless resources.

23. The apparatus of claim 15, wherein the first indication comprises:
a presence indication channel that indicates that the subset of the remaining wireless resources within the first subframe is not configured for the second type of communication.

24. The apparatus of claim 15, wherein the first indication comprises:
a presence indication channel that indicates a shape or an amount for the subset of the remaining wireless resources within the first subframe that is not configured for the second type of communication.

25. The apparatus of claim 15, wherein the instructions are further executable by the processor to:
allocate another subset of wireless communication resources from the remaining wireless resources for a third type of communication with a third type of UE, the other subset of resources being different from the subset of the remaining wireless resources; and
transmit an indication of the subset of the remaining wireless resources and the other subset of resources to one or more of the second type of UE and the third type of UE.

26. The apparatus of claim 25, wherein the second type of UE comprises a machine-type communication (MTC) UE.

27. The apparatus of claim 26, wherein the other subset of the remaining wireless resources comprises control and synchronization signaling sufficient for the MTC UE to receive the second type of communication independently of the first type of communication.

28. A non-transitory computer-readable medium storing computer-executable code for wireless communication, the code executable by a processor to:
identify a reserved set of wireless resources within a system bandwidth for a first type of communication with a first type of user equipment (UE), and remaining wireless resources that are separate from the reserved set and are within the system bandwidth;
allocate at least a subset of the remaining wireless resources for a second type of communication with a second type of UE, wherein the first type of communication has a first transmit time interval (TTI), and the second type of communication has a second TTI that differs from the first TTI;
determine that the subset of the remaining wireless resources for the second type of communication is not configured during a first subframe; and
transmit an indication that the subset of the remaining wireless resources for the second type of communication is configured during a second subframe that differs from the first subframe.

29. The method of claim 1, wherein transmitting the first indication comprises:
signaling a presence indication channel (PIC) to dynamically indicate that the subset of the remaining wireless resources for the second type of communication is not configured during the first subframe.

* * * * *